United States Patent [19]

Tojyo et al.

[11] Patent Number: 4,666,314

[45] Date of Patent: May 19, 1987

[54] METHOD AND APPARATUS FOR MEASURING TEMPERATURE IN THE HIGH PRESSURE FURNACE OF A HOT ISOSTATIC PRESSING

[75] Inventors: Shigeki Tojyo, Osaka; Tatsuo Uesaka; Yoshio Kawate, both of Kobe; Masayoshi Iwaskai, Hyogo; Takefumi Horiuchi, Kobe; Masato Moritoki; Takeshi Kanda, both of Hyogo; Takao Fujikawa; Shigeo Kofune, both of Kobe, all of Japan

[73] Assignee: Kabushiki Kaisha Kobe Seiko Sho, Kobe, Japan

[21] Appl. No.: 873,452

[22] Filed: Jun. 6, 1986

Related U.S. Application Data

[63] Continuation of Ser. No. 683,512, Dec. 19, 1984, abandoned.

[30] Foreign Application Priority Data

| Dec. 22, 1983 | [JP] | Japan | 58-243270 |
| Dec. 22, 1983 | [JP] | Japan | 58-243269 |
| Dec. 29, 1983 | [JP] | Japan | 58-243746 |
| Jun. 29, 1984 | [JP] | Japan | 59-135869 |
| Jun. 29, 1984 | [JP] | Japan | 59-135870 |

[51] Int. Cl.⁴ .................. G01J 5/06; G01J 5/08
[52] U.S. Cl. .................... 374/131; 356/44; 374/141; 374/124
[58] Field of Search ........... 374/120, 121, 130, 131, 374/149, 141, 125, 135, 139, 129, 124; 356/44; 110/190; 373/110, 136

[56] References Cited

U.S. PATENT DOCUMENTS

| 1,232,408 | 6/1917 | Thwing | 374/129 |
| 1,639,534 | 8/1927 | Ruben | 374/129 |
| 2,232,594 | 2/1941 | Dike | 374/129 |
| 3,584,509 | 6/1971 | Compton | 374/131 |
| 3,626,758 | 12/1971 | Stewart et al. | 374/129 |
| 4,086,424 | 4/1978 | Mellen Sr. | 373/136 |
| 4,281,985 | 8/1981 | Mee et al. | 373/136 |
| 4,313,344 | 2/1982 | Brogardh | 374/129 |
| 4,435,093 | 3/1984 | Krause et al. | 374/129 |
| 4,444,516 | 4/1984 | Dostoomian et al. | 374/131 |
| 4,509,179 | 4/1985 | Zimmerman | 373/110 |
| 4,525,080 | 6/1985 | Smith | 374/121 |

FOREIGN PATENT DOCUMENTS 0076086  6/1977  Japan ................... 374/131

Primary Examiner—Charles Frankfort
Assistant Examiner—Thomas B. Will
Attorney, Agent, or Firm—Oblon, Fisher, Spivak, McClelland & Maier

[57] ABSTRACT

A method of measuring the temperature in a high pressure furnace of a hot isostatic pressing apparatus, wherein a closed-end pipe having its inside communicated with the inside of the high pressure furnace and enabling a pressure medium to pass therethrough is disposed in the furnace, an incident top end of an optical fiber, a bundle of optical fibers or like other equivalent optical rod-like memeber is disposed to the open end of the closed-end pipe so as to be capable of receiving thermally radiated light from the inside of the closed-ended pipe and an exit rear end thereof is led out through a cover and to the outside of said high pressure vessel and a measuring system is connected to said exit rear end to detect heat radiation power from the top end of the closed-end pipe to thereby measure the temperature inside of the furnace.

35 Claims, 51 Drawing Figures

Figure 6(a)    Figure 6(b)
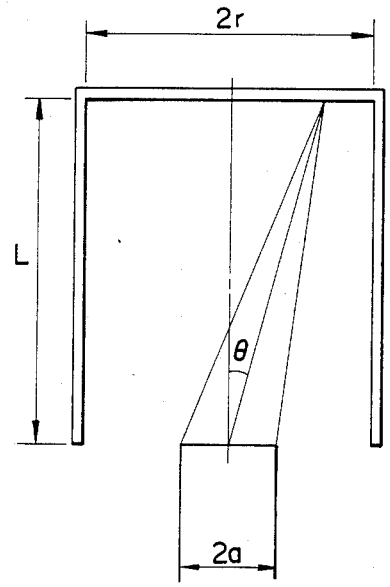
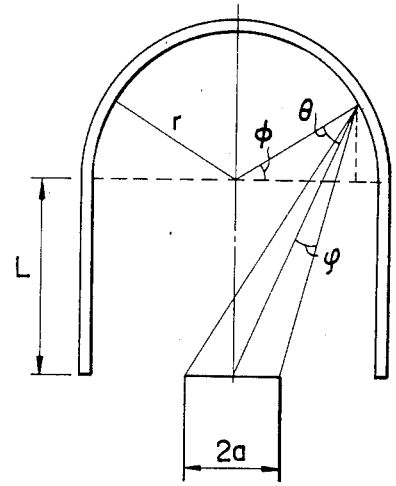
Figure 6(c)    Figure 6(d)
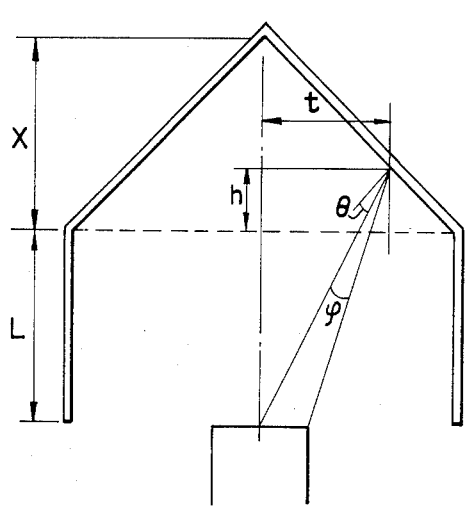
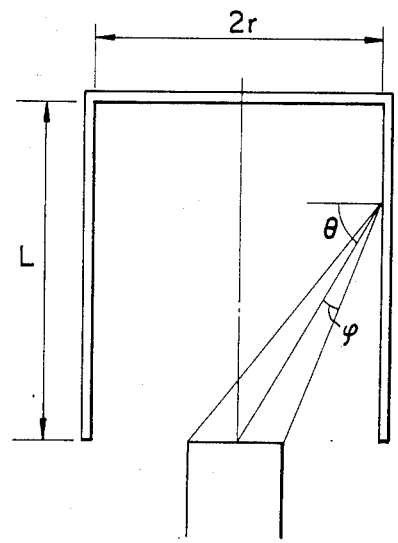

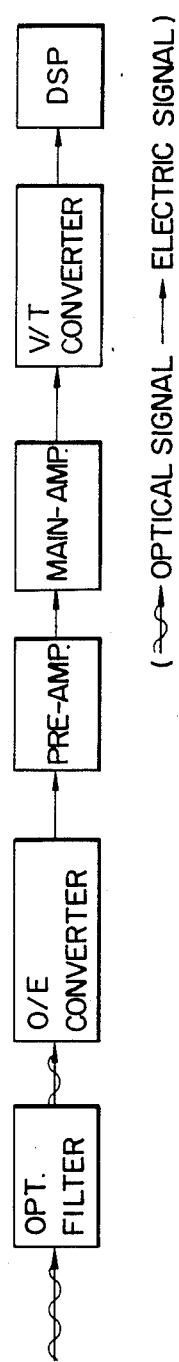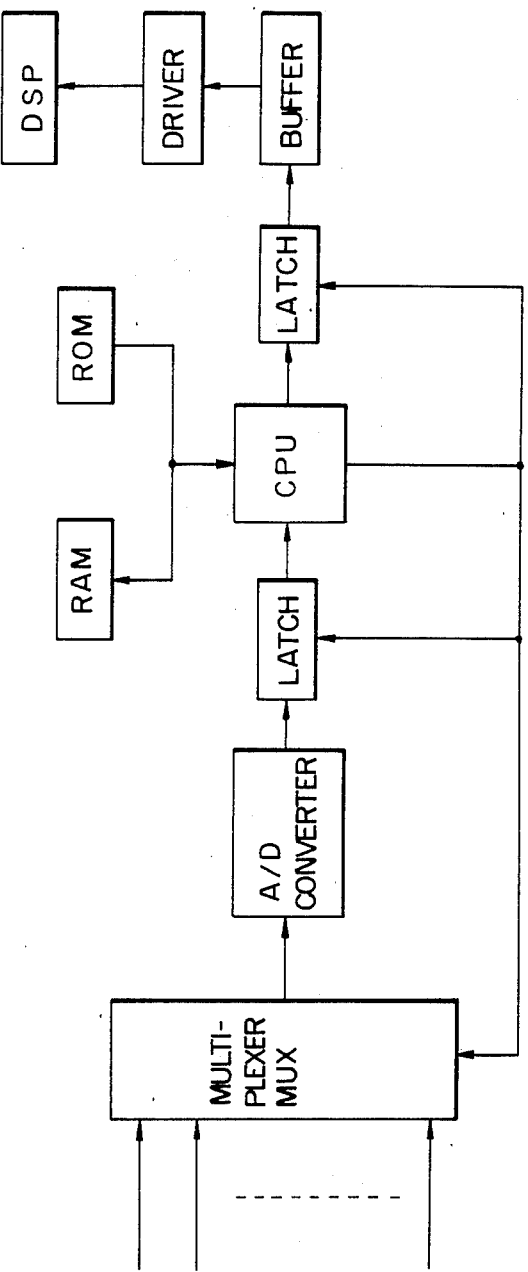
Figure 17(c)
Figure 21
(∿→ OPTICAL SIGNAL → ELECTRIC SIGNAL)

DISTANCE FROM PIPE OPENING (mm)

Figure 23(a)
Figure 23(c)
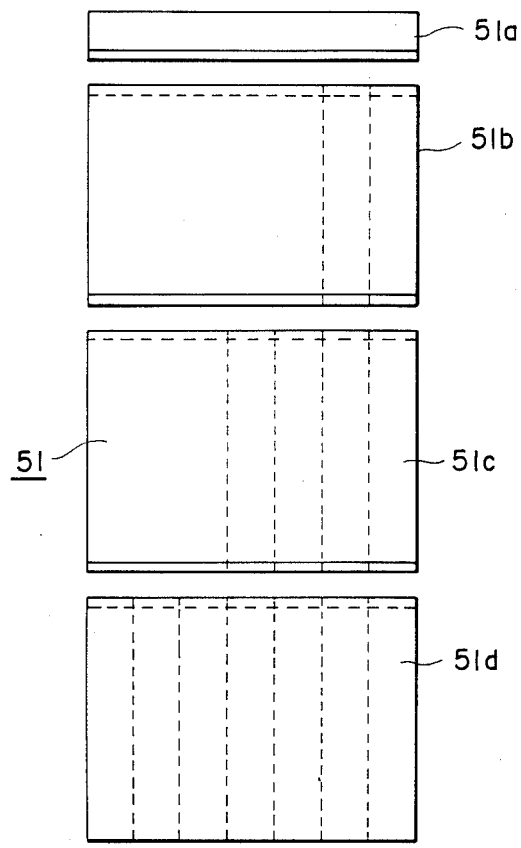
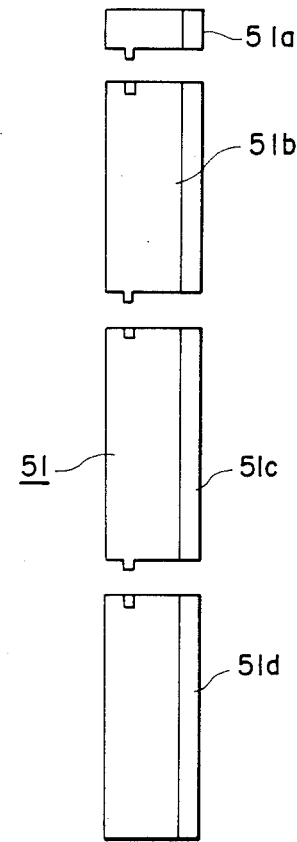
Figure 23(b)

METHOD AND APPARATUS FOR MEASURING TEMPERATURE IN THE HIGH PRESSURE FURNACE OF A HOT ISOSTATIC PRESSING

This application is a continuation of application Ser. No. 683,512, filed Dec. 19, 1984 now abandoned.

BACKGROUND OF THE INVENTION

1. Field of the Invention

This invention concerns a method and apparatus for measuring temperature and, more specifically, it relates to the measuring of temperature at a higher accuracy in a high temperature and high pressure atmosphere such as in a hot isostatic pressing.

2. Description of the Prior Art

In various industrial processes, temperature measurement is one of the important procedures and it is often required to measure temperature information that occurs in the process and transmit this information to a distant place for the control and monitor the temperature condition of the relevant process. Particularly, in the hot isostatic pressing treatment, which is utilized such as for compression molding of ceramic powder or compacting the texture of the hard alloy, it is highly desired to measure the temperature and the distribution thereof in the high temperature and high pressure furnace at a desired accuracy and maintain the atmosphere in the furnace at an optimal condition based on the measured temperature information.

In order to meet such requirements, there have been proposed and developed various temperature measuring means including, for instance, thermocouples, as well as various types of thermometers such as gas thermometer, noise thermometer, fluid thermometer and radiation thermometer. However, these conventional temperature measuring means have not yet been satisfactory.

For instance, there is a difficulty in externally taking out the temperature information from the inside of the high temperature furnace. According to the experiment reported by Battle Memorial Institute, in which heat radiation from the inside of the furnace is taken out through an optical window made of sapphire attached to the structural component of a pressure vessel for the furnace (D. C. Carmiohael, P. D. Ownby, E. S. Hodge, "Hot Isotatic of Graphite" BML-1746 (1965)), the optical window was damaged due to the high temperature and high pressure to bring about an extremely dangerous state. The optical window was excessively heated by the radiation heat-permeating therethrough which reduces the strength of the sapphire window and tended to cause destruction under the effect of the high pressure.

In addition, mounting of an optical window to the pressure vessel requires an forming opening in to the pressure vessel, which naturally reduces the pressure-resistance of the vessel. In the case of a hot isostatic pressing apparatus in which high pressure gas is sealed to the inside of the pressure vessel, destruction in the optical window or the pressure vessel may lead to fatal accidents or causeing other serious safety problems.

There is also another problem upon transmitting the temperature picked-up from the furnace. The temperature information after taken out by the foregoing thermocouples or radiation thermometer to the outside of the furnace is transmitted as electrical signals on a cable or like other line, which is extended to a distant place for the control and the monitor of the furnace, wherein noises due to electromagnetic induction or the likes will intrude into the transmission line.

In view of the above, the use of optical fibers for picking-up the radiation energy in the furnace as radiation light and transmitting the same through the optical path has recently been proposed and developed. For instance, Japanese Patent Laid-Open No. 129827/1981 proposes a thermometer using an optical fiber, in which radiation heat from a heat radiating target disposed at the incident end face of an optical fiber and the radiation light that is picked-up is transmitted through the optical fiber and then converted into electrical signals by means of an appropriate transducer for the measurement of the temperature. The problem in the structural damage at the temperature take-out portion of the furnace or the furnace body itself can be overcome and introduction of noises is also eliminated since the information is transmitted through as optical system.

However, if the heat radiating target is at an extremely high temperature, the optical fiber will be melted or devitrified thereby introducing inaccuracies. Additionally, it may become impossible to measure the temperature. Further, if the optical fiber is disposed in the high temperature and high pressure that exists in the inside of the furnace, the optical fiber would be excessively heated and dissolved by being exposed to the conduction and convection of the pressure medium at the high temperatures that exist in the furnace, which also causes a change in the optical deflection.

Further, the optical fiber disposed in the furnace may undesirably picks-up the peripheral radiation light in addition to the radiation light from the target irradiated to the incident end face of the optical fiber. Such peripheral light would cause, depending on the case, an error in the temperature measurement.

Furthermore, as a problem inherent to the use of the optical fiber, there exists the possibility of dust contamination on the incident end face of the optical fiber opposing to the target. Such a contamination will result in the decay in the amount of light incident to the optical fiber and cause noise and inaccuracy in the processed information. For instance, in the measurement for the radiation temperature using the optical fiber, if the incident end face of the fiber is contaminated to decrease the optical amount, the measured temperature would be lower than the actual temperature level.

In order to overcome the foregoing drawbacks in the prior art, the present invention use a continuous study for developing a method of measuring the temperature in the furnace of a hot isostatic pressing process using optical fiber(s) as a temperature pick-up means that can withstand the high temperature in the furnace and provide an accurate temperature measurement and which is free from the drawbacks due to the peripheral stray light or the contamination of the incident end face of the fiber.

SUMMARY OF THE INVENTION

Accordingly, it is a first object of this invention to provide a means of measuring temperature in a furnace of a hot isostatic pressing apparatus which can measure the temperature at a high accuracy and withstand the high temperature with no melting defect.

A second object of this invention is to provide a means of measuring the temperature in the furnace of a hot isostatic pressing which can provide an accurate measurement for the temperature or temperature distribution free from the effect of the peripheral light which would cause erroneous measurement.

A further object of this invention is to provide a means of measuring the temperature in the furnace of a hot isostatic pressing apparatus with no drawback of contamination to the incident end face of the optical fiber which may cause measuring error.

The first object of this invention can be attained according to this invention by providing a means of measuring the temperature in the high pressure furnace of a hot isostatic pressing apparatus in which a heat insulating layer and a heating device are disposed to the inside of a high pressure vessel to constitute the high pressure furnace for applying hot isostatic pressing treatment for the material to be processed contained therein, wherein a closed-end pipe having its inside communicated with the inside of the high pressure furnace and enabling a pressure medium to pass therethrough is disposed in the furnace, an incident top end of an optical fiber, a bundle of optical fibers or like other equivalent optical rod-like member is disposed to the open end of the closed-end pipe so as to be capable of receiving thermally radiated light from the inside of the furnace and an exit rear end thereof is led out through a cover and to the outside of the high pressure vessel and measuring system is connected to the exit rear end to detect heat radiation power from the top end of the closed-end pipe to thereby measure the temperature inside of the furnace.

Since the optical fiber or the like is disposed within the closed-end pipe, high accuracy in the temperature measurement can be obtained without undesired melting of the optical fiber and free from the effect of heat convection and thus the change in the optical deflection. Further, since the incident end face of the optical fiber is situated within the closed-end pipe, contamination at the incident end face of the optical fiber can be reduced to improve the measuring accuracy.

The second object can be attained according to this invention by measuring the temperature distribution in the high pressure furnace of a hot isostatic pressing apparatus, in which a heat insulating layer and a heating device are disposed to the inside of a high pressure vessel, to constitute high pressure furnace for applying hot isostatic pressing treatment for the material to be processed contained therein, wherein a plurality of closed-end pipes each of different length having its inside communicated with the inside of the high pressure furnace and enabling pressure medium to pass therethrough are disposed, with the top end for each of the closed-end pipes being situated so as to be in equilibrium with the peripheral temperature and issue radiation heat corresponding to each of heating zones to the inside of each closed-end pipe, and an incident top end of an optical fiber, a bundle of optical fibers or like other equivalent rod-like optical member is disposed to the open end for each of the closed-end pipes so as to be capable of receiving the thermally radiated light from the inner wall of each of the closed-end pipes and an exit rear end thereof is led out through a cover and to the outside of the high pressure vessel, a measuring system is connected to each of the exit rear ends to detect heat radiation power from the inner wall of each of the closed-end pipes, a compensating operation is performed for subtracting the heat radiation power entered from the inner wall of each the closed-end pipes into the optical fiber, the bundle of optical fibers or like other equivalent rod-like optical member to take out a temperature due to the heat radiation power from the top end of the closed-end pipe in each of the heating zones in the high pressure vessel, thereby measuring the temperature distribution at the heating zone in the furnace.

In the apparatus as described above, since a plurality of optical fibers are situated within a plurality of closed-end pipes respectively so as to receive the radiation heat at the different height of the furnace, and the temperature information taken out from the optical fibers are processed mathematically so as to compensate the peripheral radiation light which would otherwise cause measuring errors, temperature or the distribution thereof within the furnace can be measured at a high accuracy.

Furthermore, in a preferred embodiment according to this invention, the contamination resulted to the incident end face of the optical fiber can be eliminated by a method of measuring the temperature in the high pressure furnace of a hot isostatic pressing apparatus, wherein a reference optical source is disposed and the reference light therefrom is entered from the exit end face of the optical fiber, the bundle of optical fibers or like other equivalent rod-like optical member for picking-up the radiation energy in the furnace, the reflection light from the other end face (incident end face for the radiation energy from the furnace) of the optical fiber, the bundle of optical fibers or like other equivalent rod-like optical member due to said incident reference light is taken out together with the radiation energy from the inside of the furnace, the energy thus taken out is subsequently separated into the radiation light from the inside of the furnace and the reflected reference light, to determine the entire optical transmittaance for the optical fiber, bundle of optical fibers or like other equivalent rod-like optical member also including the losses at the end faces thereof, and optical information due to the radiation energy from the inside of the furnace is amended based on said transmittance.

In the invention described above, since the contamination error can be compensated by the use of a reference light, followed by the mathematical compensation processing, the troublesome and difficult cleaning of the contamination is not required, thereby providing a great contribution in the reduction of maintenance and repair procedures.

The contamination for the incident end face of the optical fiber can also be eliminated in another preferred embodiment of this invention by providing a reference light source, a first optical fiber, bundle of optical fibers or the like other equivalent rod-like optical member for picking-up the radiation energy in the furnace and a second optical fiber, bundle of optical fibers or like other equivalent rod-like optical member different therefrom, in which reference light from the reference light source is irradiated through said second optical fiber, bundle of optical fibers or like other equivalent rod-like optical member to the incident end face of said first optical fiber, bundle of optical fibers and like other equivalent rod-like optical member, said reference light is taken out together with the radiation energy from the inside of the furnace passing through said optical fiber, bundle of optical fibers or like other equivalent rod-like optical member, thereafter, the thus taken out energy is separated into the radiation light from the inside of the furnace and the reference light to determine the entire transmittance of said first optical fiber, bundle of optical fibers and like other equivalent rod-like optical member including the optical loss at the end faces thereof, and the optical information due to the radiation energy from the inside of the furnace is compensated based on the transmittance.

BRIEF DESCRIPTION OF THE ACCOMPANYING DRAWINGS

These and other objects as well as features of this invention will become apparent by reading the following detailed description in conjunction with the accompanying drawings, in which FIG. 1 is a diagram showing the relationship between the detection wavelength and the measuring error in the temperature;

Figure 7A:
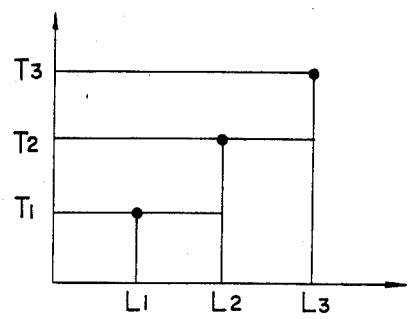
Figure 9A:
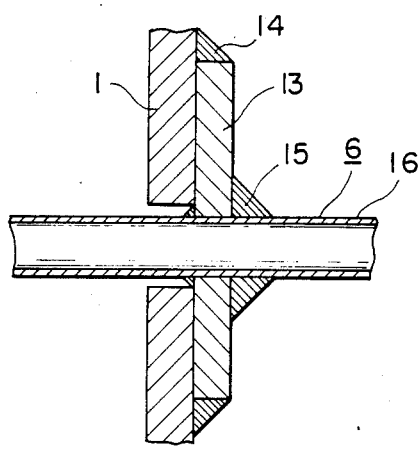
Figure 8A:
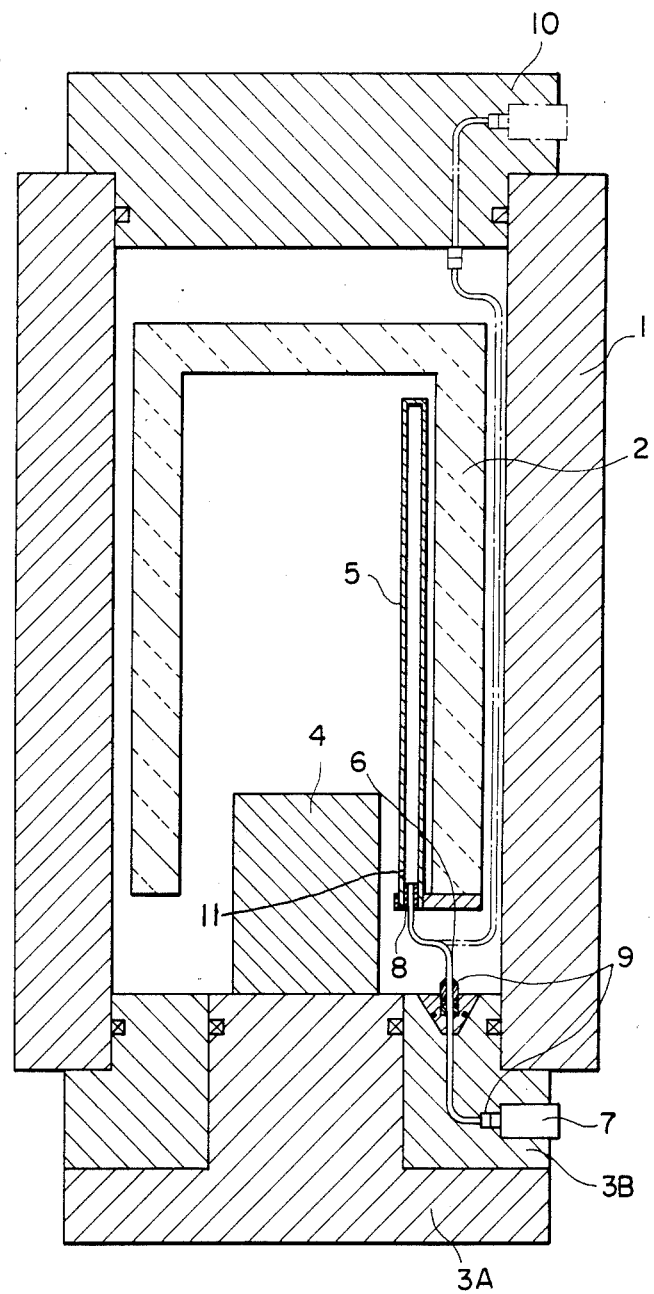
Figure 8B:
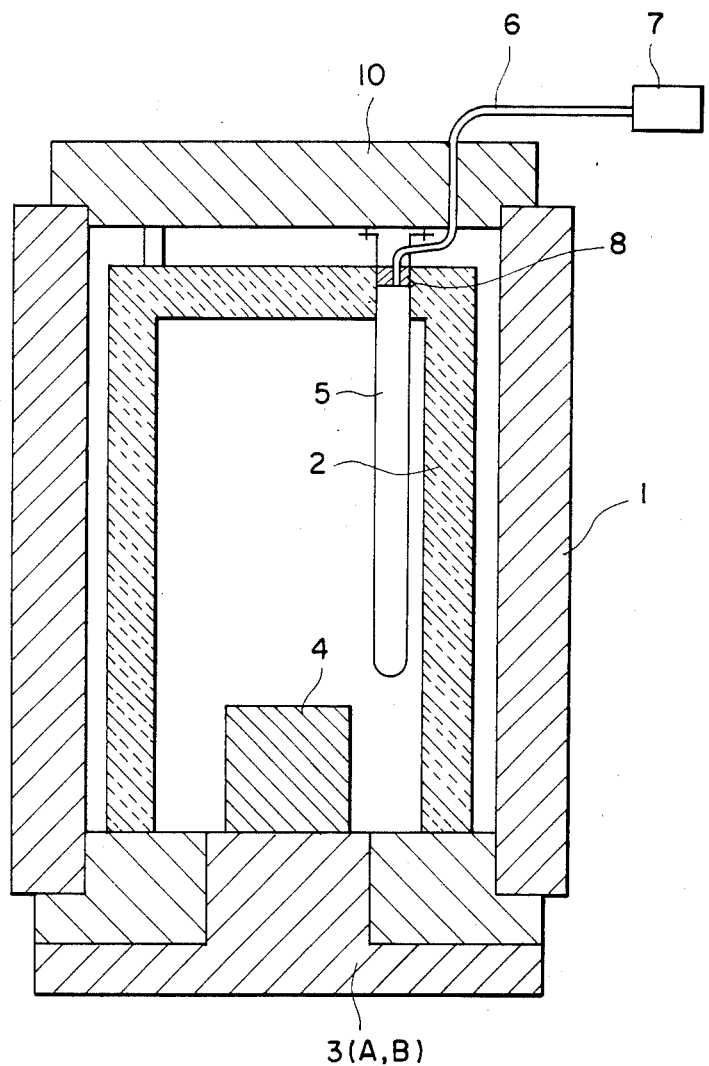
Figure 10A:
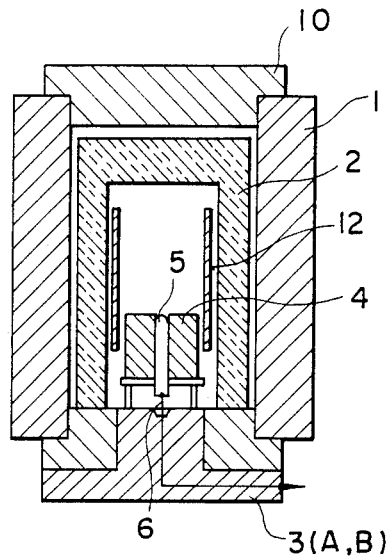
Figure 10B:
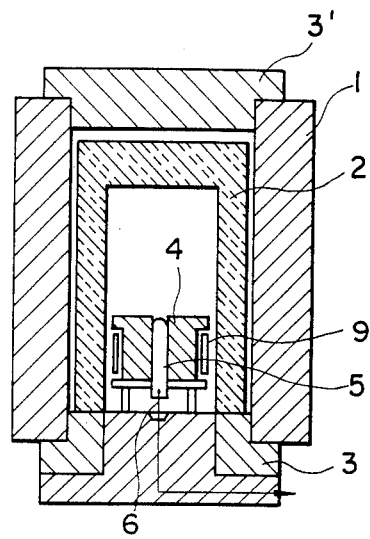
Figure 10C:
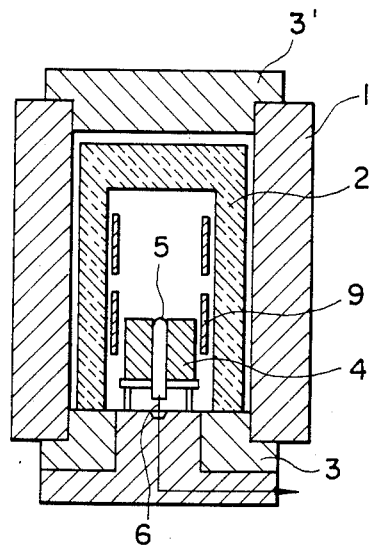
Figure 11A:
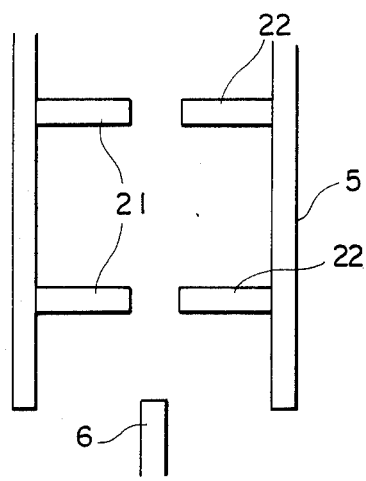
Figure 12A:
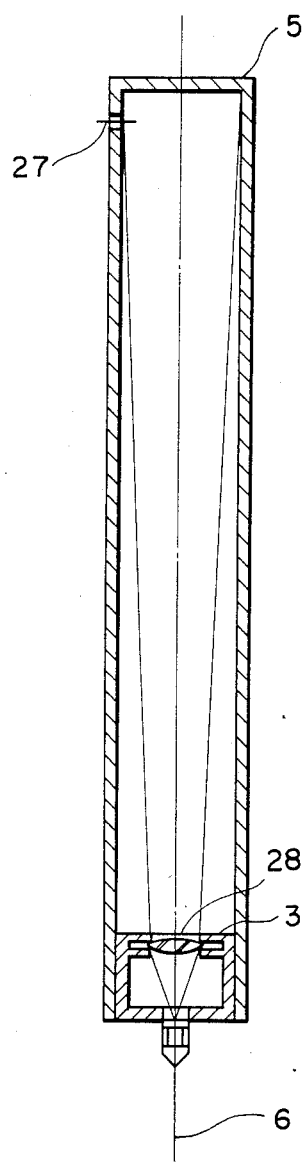
Figure 13:
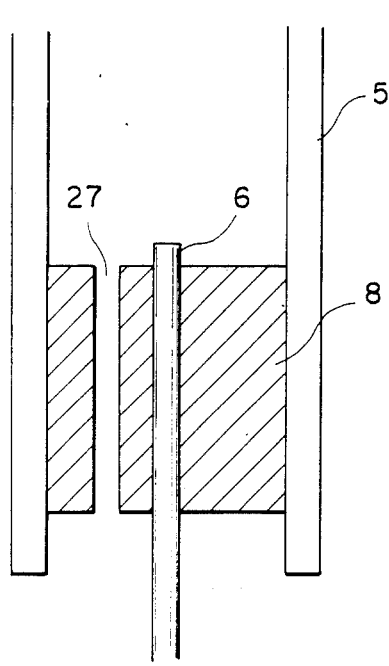
Figure 16:
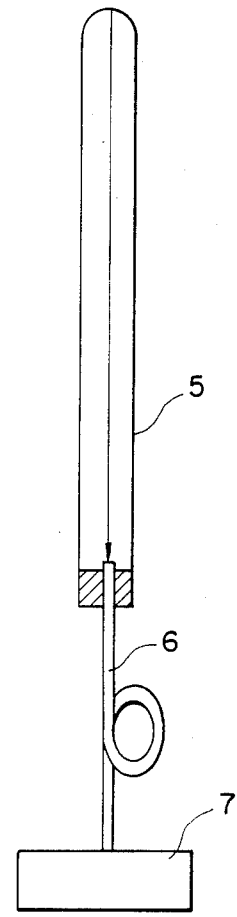
Figure 15A:
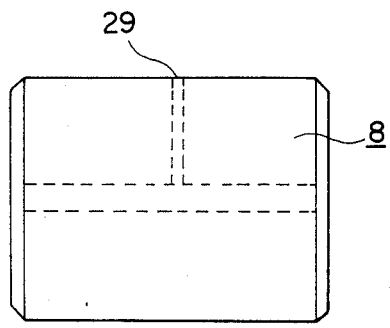
Figure 15B:
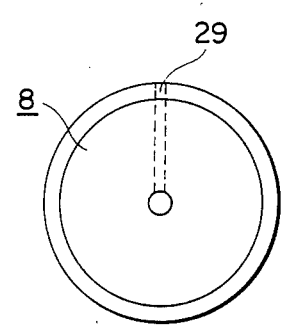
Figure 14A:
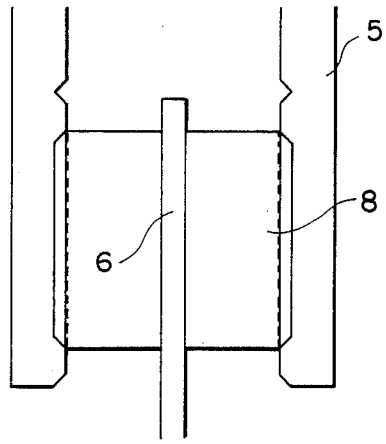
Figure 17A:
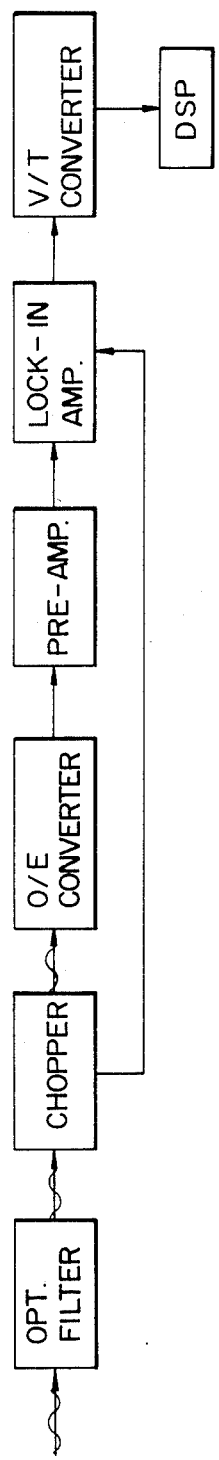
Figure 17B:
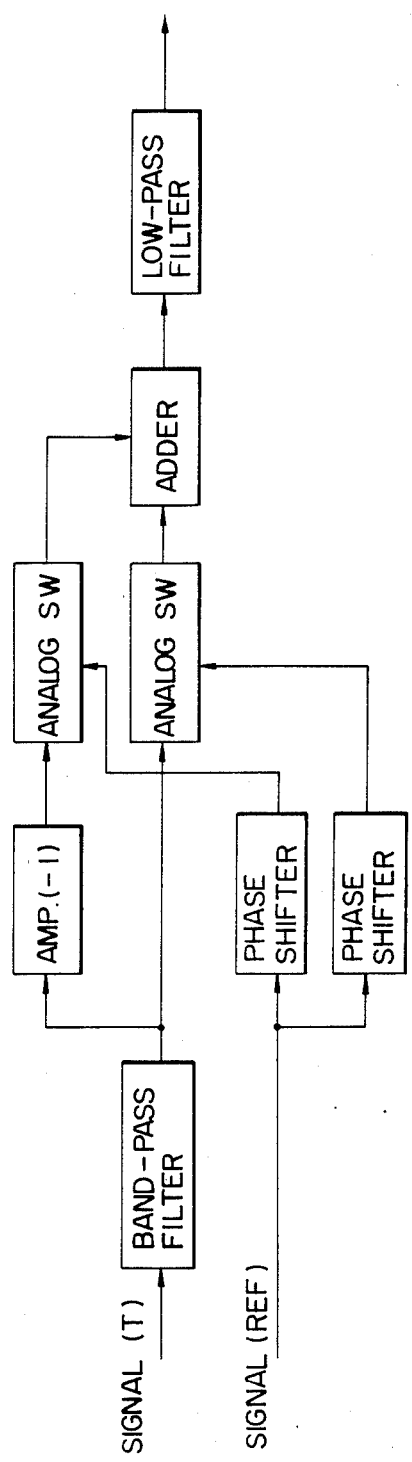
Figure 18:
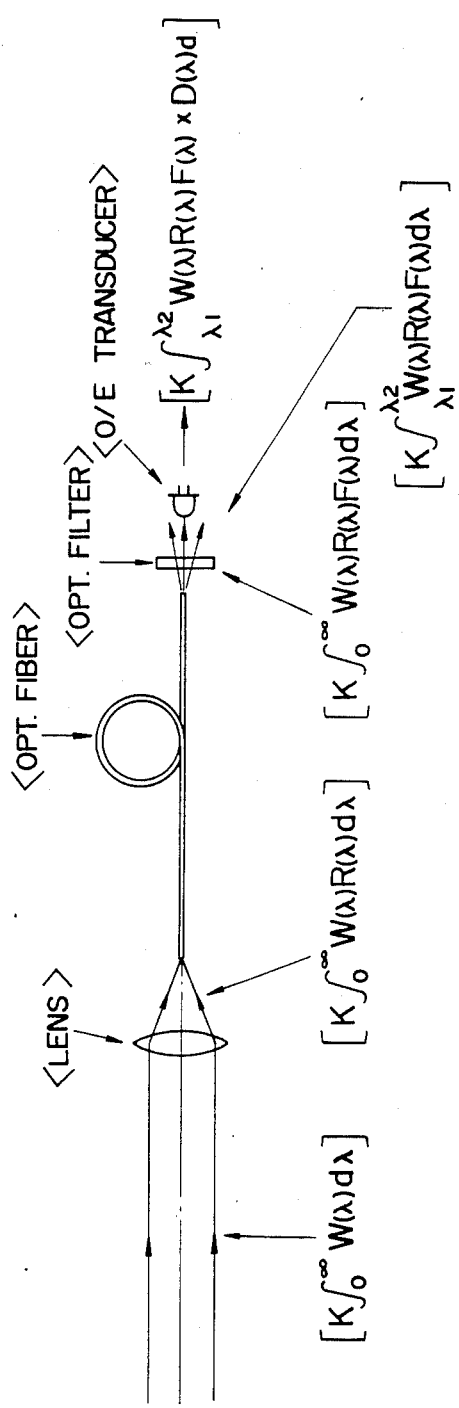
Figures 19, 20:
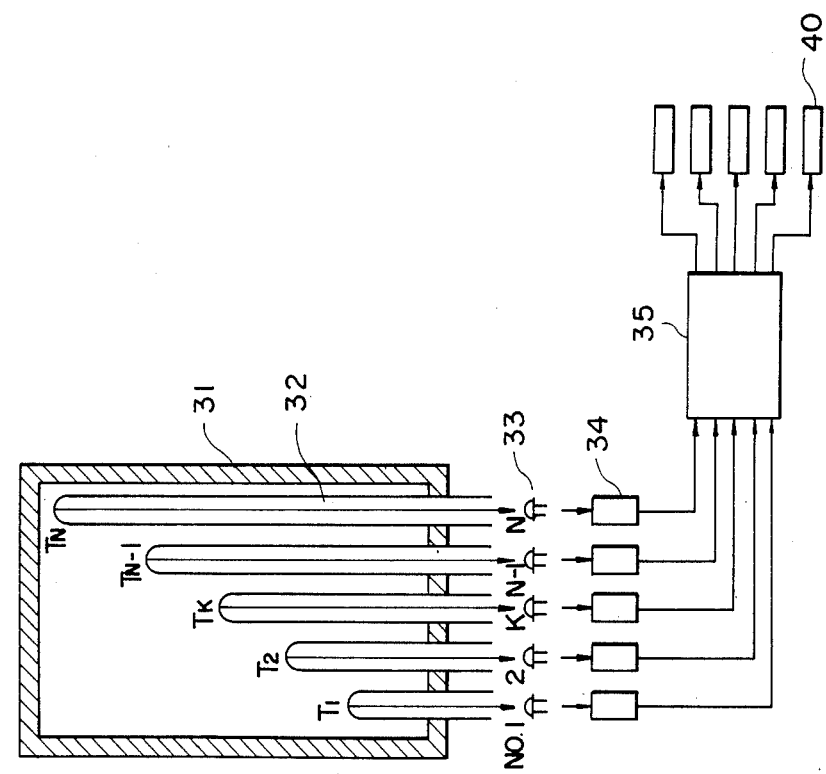
Figure 22A:
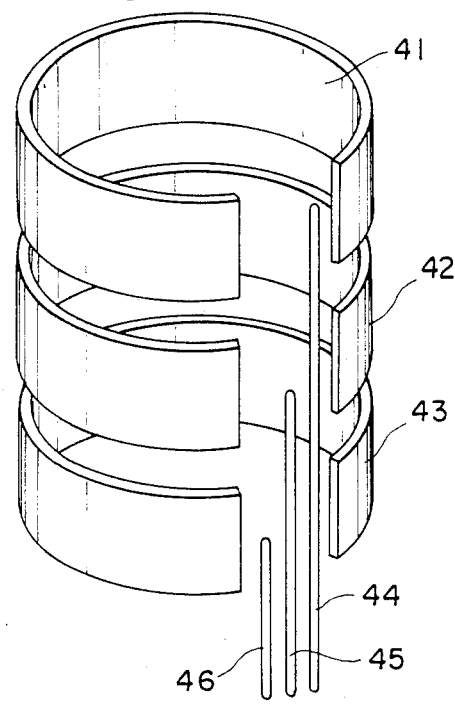
Figure 22B:
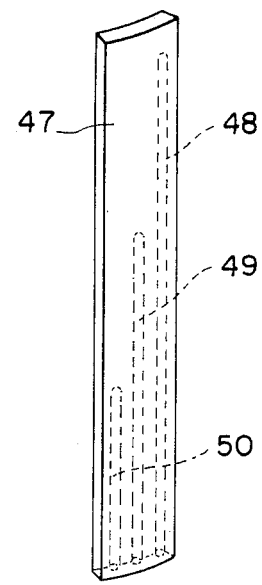
Figure 25:
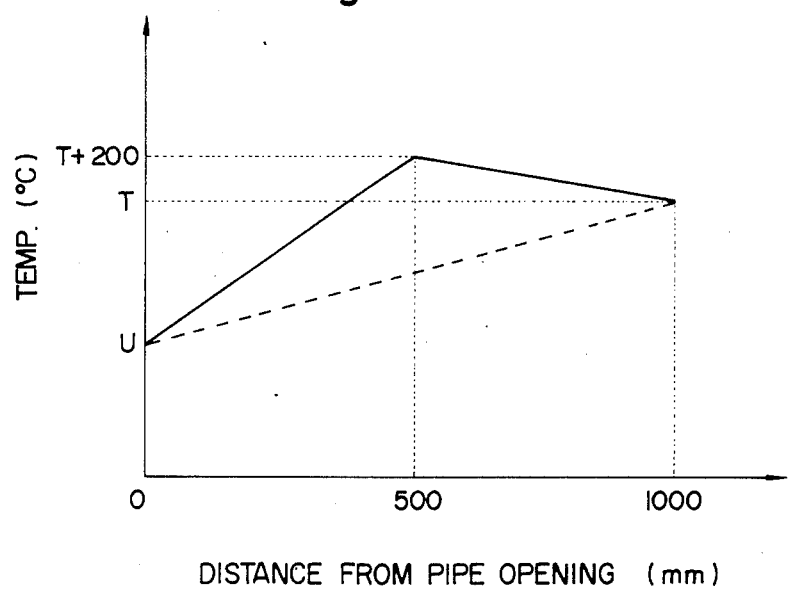
Figure 24:
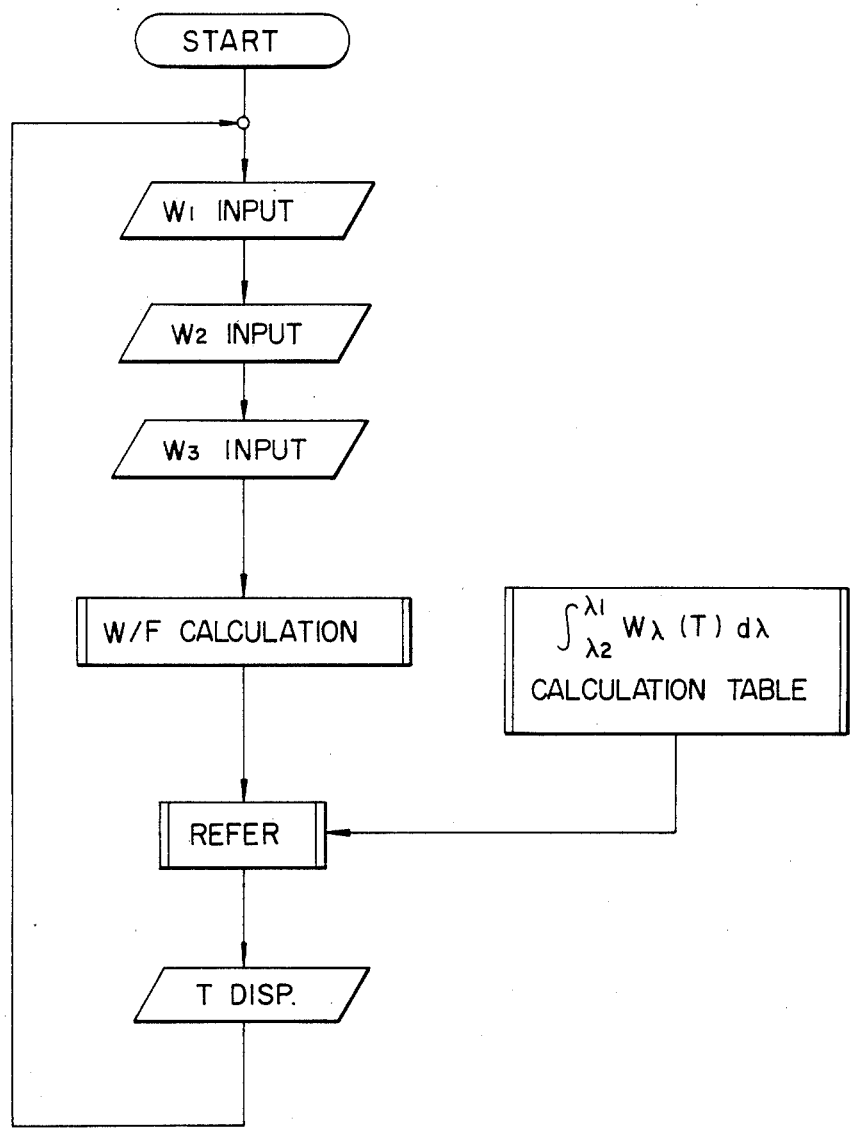
Figure 26:
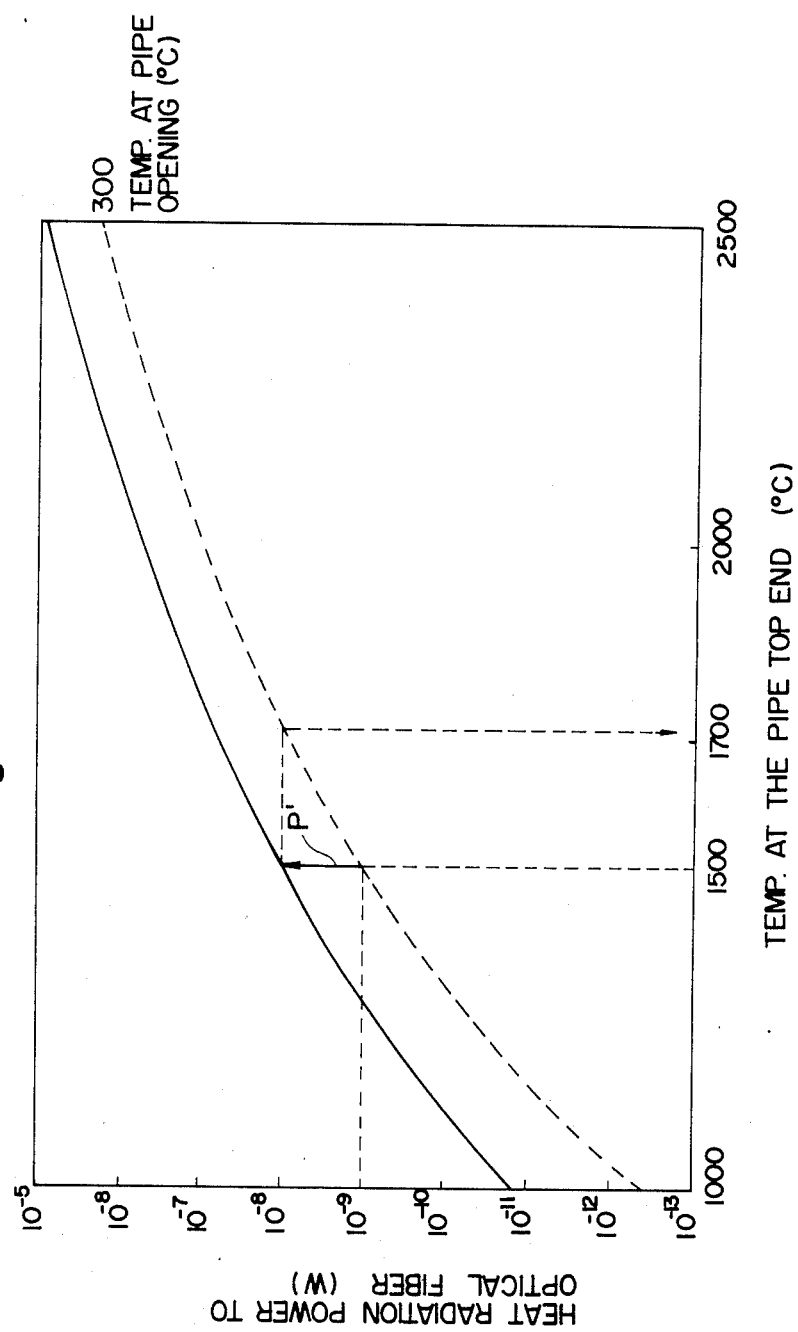
Figure 27:
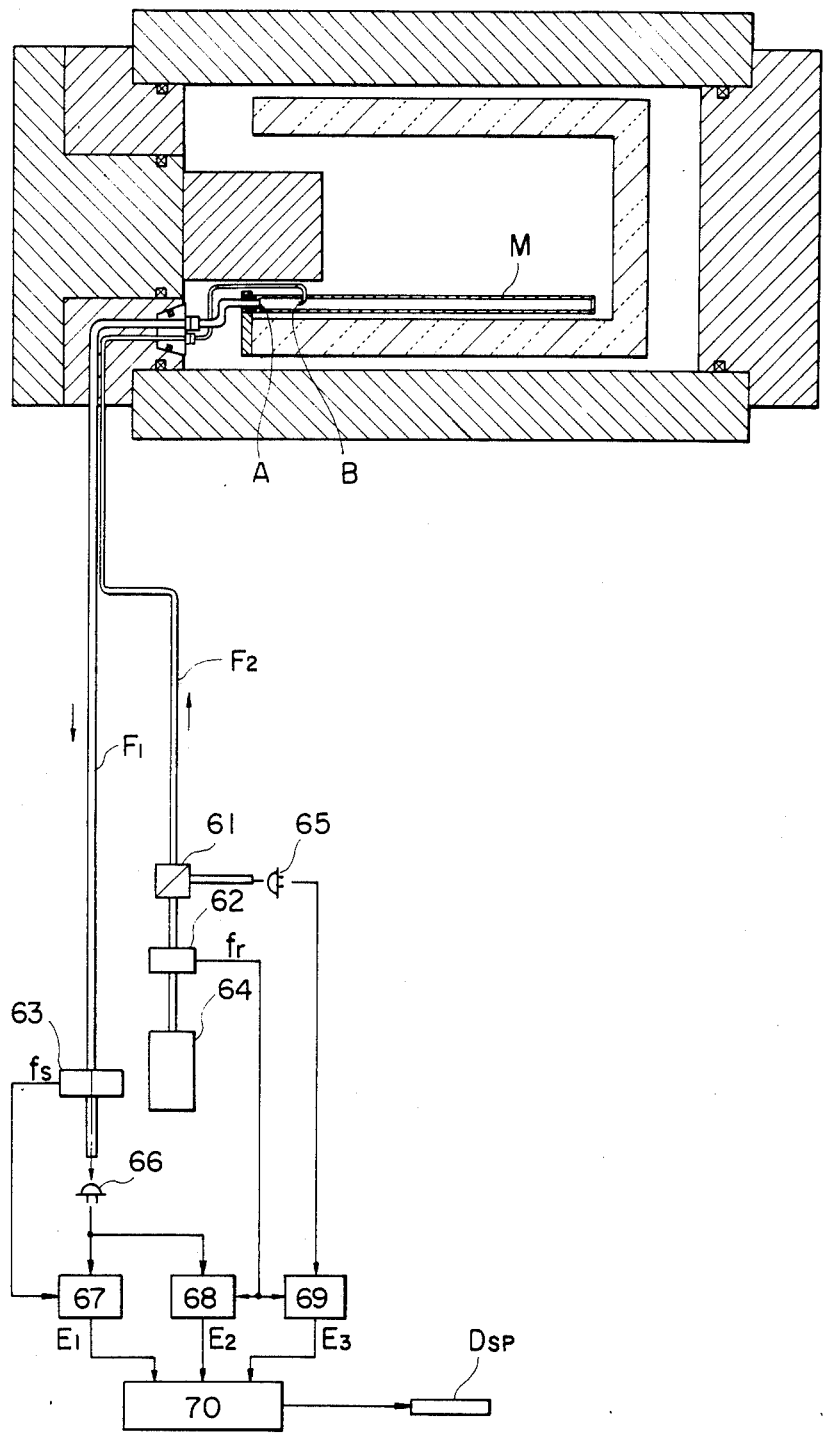
Figure 28:
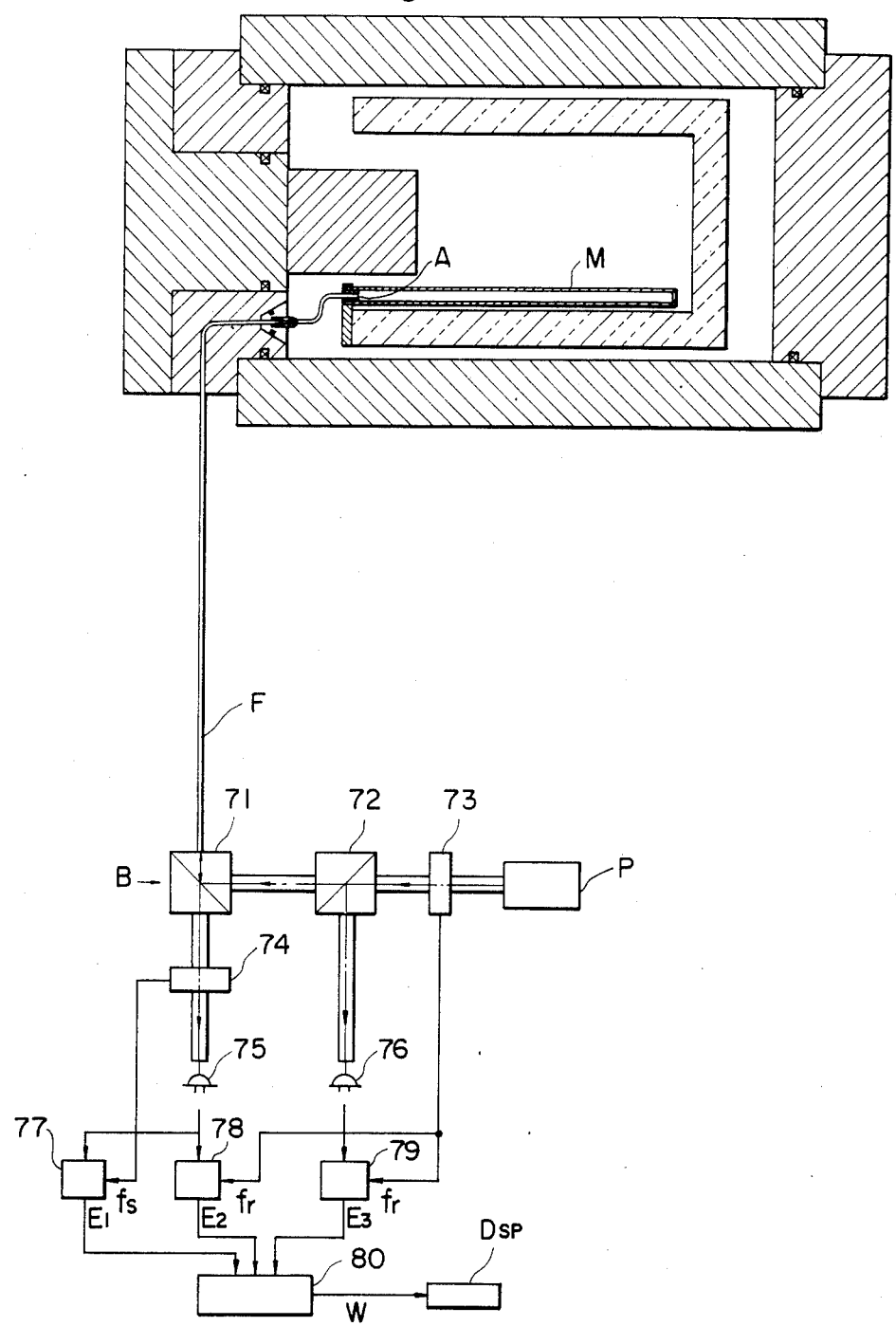
Figure 29:
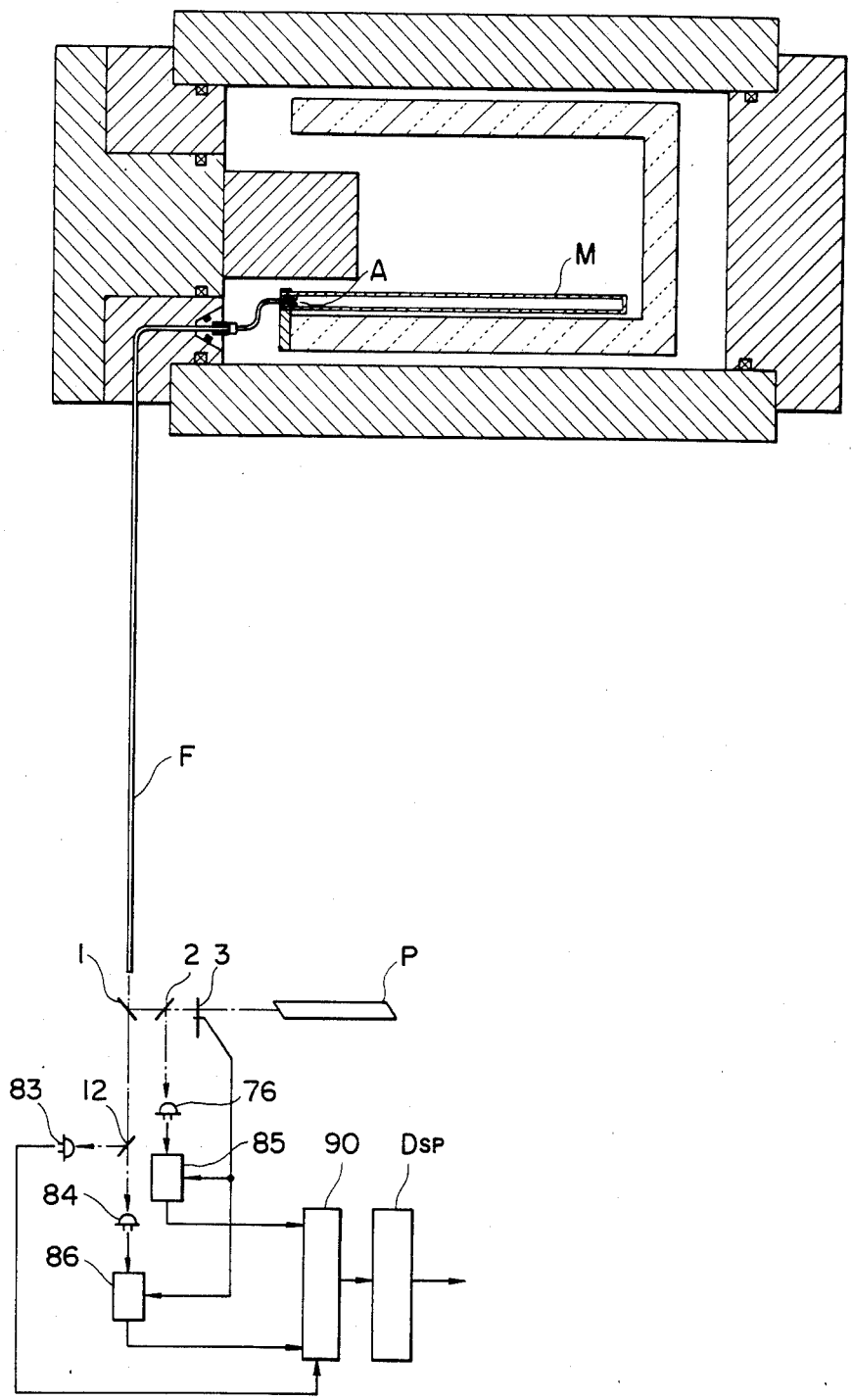

FIGS. 6(a), (b), (c), (d) are explanatory views for the respective shapes at the top end of the closed-end pipe;

FIG. 7(a), (b) are schematic diagrams showing the change of the temperature at the side wall of the pipe respectively;

FIG. 8A is a schematic cross sectional view for one embodiment of the apparatus of this invention;

FIG. 8B is a schematic cross sectional view for another embodiment of the apparatus of this invention;

FIGS. 9(a), (b), (c) are enlarged cross sectional views corresponding to a portion of FIG. 7 for showing respective sealing structures for the optical fiber;

FIGS. 10(a), (b), (c) are schematic cross sectional views for other respective embodiments of this invention;

FIGS. 11(a), (b), (c), (d) are explanatory views for a collimator attached to the closed-end pipe;

FIGS. 12(a), (b) are vertical cross sectional views for closed-end pipes showing typical arrangement of a pressure-equalizing hole formed to the pipe;

FIG. 13 is an enlarged cross sectional view showing another arrangement of the pressure-equalizing hole;

FIGS. 14(a), (b), (c), (d) are explanatory views for the respective embodiments of a holder for the optical fiber;

FIGS. 15(a), (b) are explanatory front and side elevational views illustrating the connection of the optical fiber to the fiber holder;

FIG. 16 is an explanatory view for the connection of the optical fiber to a measuring system;

FIGS. 17(a), (b), (c) are block diagrams for the radiation thermometer and the lock-in amplifier used therein in the apparatus for use in this invention;

FIG. 18 is a explanatory view illustrating the principle for the method of measuring the radiation temperature employed in this invention;

FIGS. 19 and 20 are explanatory diagrams of respective measuring systems for the temperature distribution in the furnace;

FIG. 21 is a block diagram of a computer for use in the measuring systems illustrated in FIGS. 19 and 20;

FIGS. 22(a), (b) are perspective views for respective arrangements of closed-end pipes in different embodiments of three-zone type heater;

FIGS. 23(a), (b), (c) show the manner of assembling the integral type closed-end shown in FIG. 22(b), in which FIG. 23(a) is a front elevational view, 23(b) is an upper plan view and 23(c) is a side elevational view;

FIG. 24 is a flow chart for measuring the distribution of temperature by the method according to this invention;

FIG. 25 is a diagram showing a relationship between the temperature and the distance from the open end of the closed-end pipe;

FIG. 26 is a diagram showing a relationship between the heat radiation power incident to the optical fiber and the temperature at the top end of the closed-end pipe; and FIGS. 27, 28 and 29 are block diagrams showing, respectively, different circuits for the compensation of contaminations caused to the incident end face of the optical fiber for use in the measuring methods according to this invention.

DESCRIPTION OF THE PREFERRED EMBODIMENTS

Measuring the temperature in the furnace of a hot isostatic pressing apparatus according to this invention can be practiced in various embodiments. Prior to the detailed descriptions for each of such embodiments, the principle and the outline of the methodology in common to each of the embodiments will now be described briefly.

A closed-end pipe is disposed to the inside of a high pressure furnace in a hot isostatic pressing apparatus and an incident end face of an optical fiber is disposed to the opening of the closed-end pipe such that the light radiated from the inside of the furnace can be received at the incident end face of the optical fiber, and the heat radiation power from the top end of the closed-end pipe is guided through the optical fiber from the pressure vessel to the outside of the furnace and then processed by a measuring system connected to the exit end of the optical fiber to measure the temperature in the inside of the furnace. In this case, the optical fiber is situated to a portion of the closed-end pipe which is at a relatively low temperature such that there is a certain distance between the heat radiating portion and the incident end face of the optical fibers that is enclosed within the closed-end pipe. The temperature radiation portion may be disposed at the closed top end of the closed-end pipe.

The closed-end pipe is usually made of heat resistant material such as tungsten, molybdenum, boron nitride and graphite. A holder is fitted to the opening of the closed-end pipe through which is passed an optical fiber that conducts the thermally radiated heat from the top end of the closed-end pipe by way of the lower or upper cover of the high pressure vessel of the hot isostatic pressing apparatus, to the outside of the furnace. The radiation light led to the outside of the furnace is converted into temperature by means of luminance-temperature conversion, two-color temperature operation or the like and the heat radiation, particularly, heat radiation power is detected by means of a measuring system comprising a radiation thermometer connected thereto.

Usually, a Si photodiode is employed as the photoelectronic conversion device for the radiation thermometer. However, since the spectral sensitivity of the Si photodiode suddenly decreases at the wavelength of about 0.4 um, photon counting means by the use of a known photomultiplier may be employed for the measurement of the radiation heat with a wave length of less than 0.4 $\mu$m.

The principle of detecting the temperature inside of the furnace due to the heat radiation power incident to the optical fiber in the method of measuring the temperature according to this invention has already been known, for example, as is shown in Japanese Patent Laid-Open No. 129827/1981.

As the optical fiber usable herein can be in addition to a single strand of fiber, a bundle of optical fibers for compensating the insufficiency of optical amount and the strength of the fiber. Further, rod-like optical material such as of a glass or sapphire rod having the same function may also be used.

Since the optical fiber for guiding the radiation heat in the method of measuring the temperature according to this invention has a wide view angle, radiation heat may also enter from the side wall of the closed-end pipe with a temperature distribution, which adds to the radiation heat from the top end of the closed-end pipe thereby causing errors in the measuring of the temperature at the top end of the closed-end pipe.

In order to decrease the foregoing error, the wavelength of the radiation thermometer upon measuring the temperature is shortened so that the effect of the radiation heat from the side wall, that is, a lower temperature portion is reduced, in view of the fact that the temperature at the top end is lower than the temperature at the bottom of the closed-end pipe.

Figure 1:
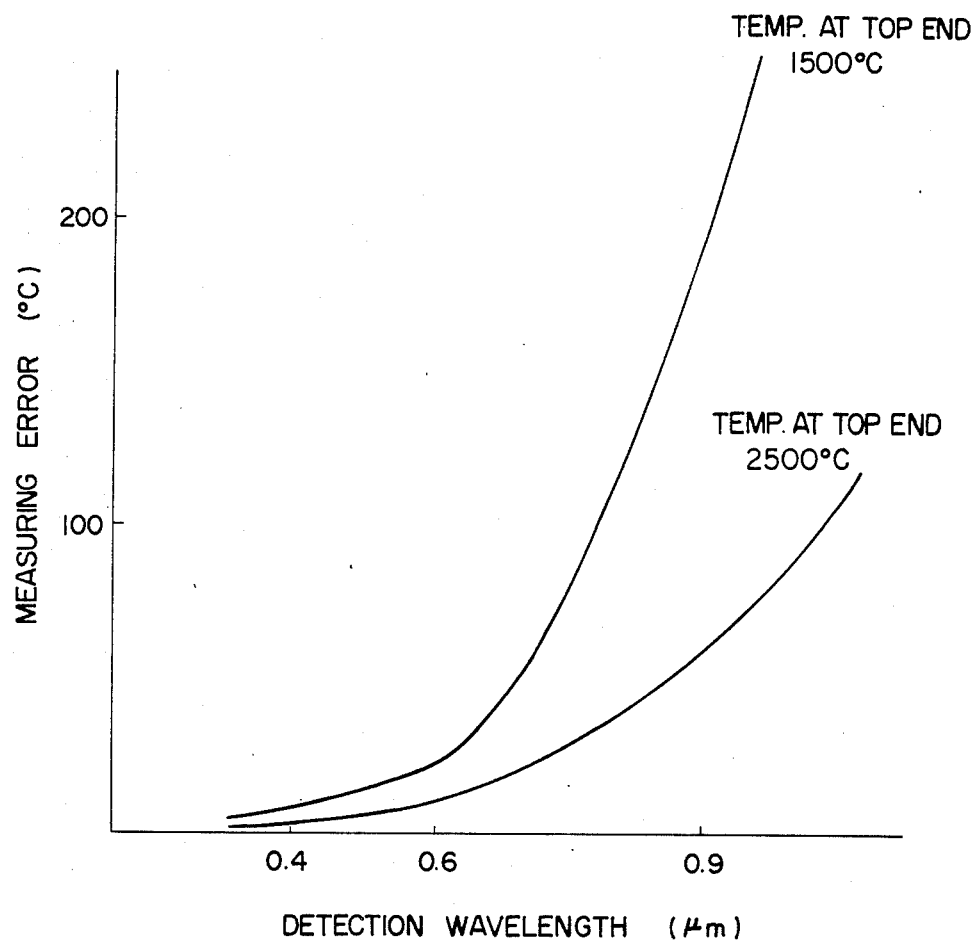

FIG. 1 shows the error in the temperature measurement when radiation light is transmitted through an optical fiber with the core diameter of 400 $\mu$m and disposed in a closed-end pipe 1 m of length and 10 mm of diameter and then subjected to luminance-temperature conversion, in which the error is expressed as a fluctuation value in the indicated temperature of the radiation thermometer when the temperature at the bottom of the closed-end pipe changes from 300° C. to 700° C. assuming that the temperature distribution on the side wall of the closed-end pipe is monotonously increased from the bottom to the top end of the closed-end pipe.

It can be seen from the figure that the error upon measurement of temperature nearly at 2000° C. can be suppressed to less than 1% by setting the detection wavelength to less than 0.6 $\mu$m.

Specifically, the detection wavelength of less than 0.6 $\mu$m will be effective in order to suppress the error for the temperature measurement within ±1% in a case where the temperature at the top end of the closed-end pipe is, for instance, at about 1000° C. (the temperature of the target).

In the case of temperature conversion by means of two-color temperature operation, the error in the temperature measurement can also be decreased by shortening the detection wavelength. For example, if the temperature at the opening (bottom end) of the closed-end pipe changes from 300° C. to 700° C. with the temperature at the top end of the closed-end pipe being at 2000° C., temperature fluctuation is calculated as 5° C. in the case of detection wavelength of 0.4 $\mu$m and 0.42 $\mu$m, as 24° C. in the case of wavelength of 0.50 $\mu$m and 0.52 $\mu$m, and as 42° C. in the case of wavelength of 0.6 $\mu$m and 0.62 $\mu$m. Accordingly, it can be recognized effective that the detection wavelength be decreased to less than 0.6 $\mu$m in order to suppress the error in the temperature measurement to less than 1%.

As described above, the error in the temperature measurement can thus be decreased as the wavelength becomes shorter. On the contrary, it is difficult to detect the temperature, at the wavelength of less than 0.2 $\mu$m, in view of the restriction for the optical material and, therefore, the lower limit of the wavelength is preferably 0.3 $\mu$m.

Figure 2:
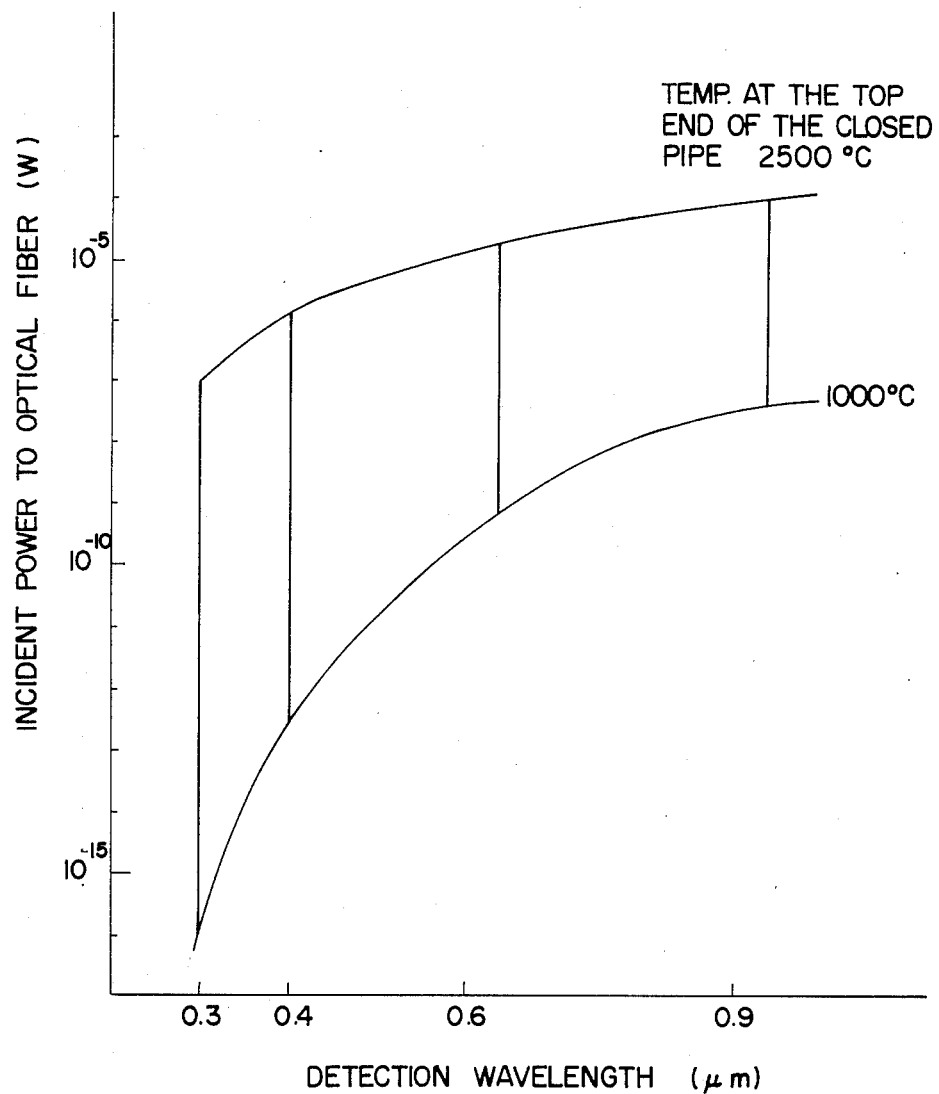
FIG. 2 is a diagram showing the dependency of the heat radiation power on the detection wavelength.
Figure 3:
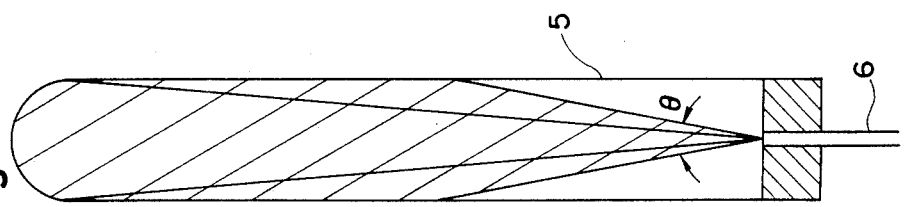
FIG. 3 is an explanatory view for the view angle of an optical fiber disposed in the closed-end pipe.

Assuming that an optical fiber with a core diameter of 400 $\mu$m and a view angle $\theta$ (refer to FIG. 3) of 24° is disposed to the closed-end pipe of 1 m length and 10 mm diameter and further that the temperature on a pipe wall is increased with a linear slope from the bottom of the closed-end pipe at the temperature of 300° C. toward the top end, the wavelength dependency of the heat radiation power incident from the closed-end pipe to the optical fiber is expressed as shown in FIG. 2. Accordingly, it can be recognized that no substantial temperature measurement can be obtained with the detection wavelength of less than 3 $\mu$m in view of the wavelength transmittance characteristic of the optical material such as a condensor lens on the detector side of the optical fiber and the sensitivity characteristic of the photomultiplier PM to the detection wavelength.

While on the other hand, the foregoings can also be recognized from the problem of the temperature analyzing performance.

The temperature analyzing performance is defined by considering the SN ratio 2 (SN ratio is necessarily greater than 1 for converting the PM output into temperature) as a limit capable of detecting the resultant change and by calculating the change of temperature at the top end of the pipe that corresponds to six photons input to the photomultiplier due to the fact that three cps of dark noise pulses (3 count/sec) are generated when no optical input is incident to the photomultiplier.

Figure 4:
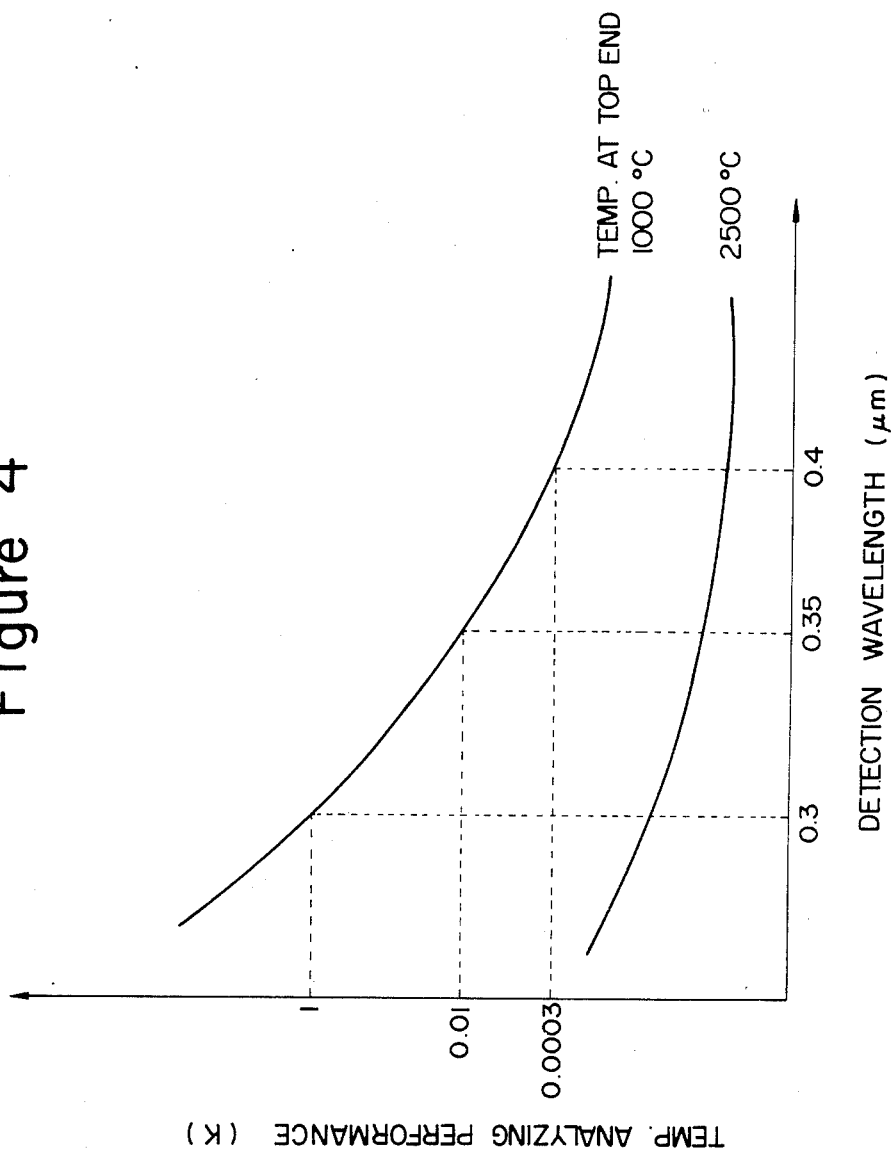
FIG. 4 is a diagram showing the dependency of the temperature analyzing performance on the detection wavelength.

Therefore, the wavelength dependency of the temperature analyzing performance relative to the target at 1000° C., with 1 sec of time constant, is calculated based upon the premiss of using the photon counting method by a photomultiplier and the result as is shown in FIG. 4. It can be seen from the figure that a wavelength of greater than 0.3 $\mu$m is necessary in order to increase the temperature analyzing performance to more than 1K, as described above.

Specifically, it is effective upon measuring the temperature according to this invention to set the actual detection wavelength in the range between 0.3 $\mu$m and 0.6 $\mu$m.

Further, in this invention it is also preferred to provide a collimator at the bottom end of the closed-end pipe in order to prevent the heat radiation from the side wall of the closed-end pipe from entering into the optical fiber as described above. Furthermore, it is also important and essential to form a pressure-equalizing hole to the closed-end pipe in order to equalize the pressure between the inside of the closed-end pipe and the inside of the furnace, so that the pipe will not be damaged by a pressure difference. In this case, it is desired upon forming such a pressure-equalizing hole that it may not cause a significant convection to the inside of the pipe and not contaminate the inside of the pipe, as well as that the hole is not situated within the view angle of the incident end face of the optical fiber.

Furthermore, the number of the closed-end pipe disposed to the inside of the furnace may optionally be varied as required. For instance, a plurality of closed-end pipes may be disposed while varying their height for measuring the temperature of target, disposed at different height in the inside of the furnace, so that the vertical temperature distribution in the inside of the furnace can be detected.

In measuring the temperature according to this invention, it is important to pick-up only the heat radiation power from the top end of the closed-end pipe and determine the temperature based thereon, since the peripheral heat radiated from the side wall causes a error in the measurement of the heat incident to the optical fiber.

In a case of a closed-end pipe disposed to the lowest heating zone in the furnace where only the top end of the pipe is heated by a heater, or in a case of a plurality number (N) of closed-end pipes where the temperature at the top ends of closed-end pipes is in the relationship: $T1 < T2 < \ldots < TN-1 < TN$ (the height of the closed-end pipe is assumed to increase in this recited order), since the temperature for the side wall is sufficiently lower than that for the top end in each pipe, it is possible to pick-up only the heat radiated from each of the respective top ends, by properly shortening the detection wavelength of the radiation thermometer to such an extent that the heat radiation from the side wall is negligible, and the temperature can be measured at a high accuracy.

However, if there are a plurality of vertically divided heating zones and closed-end pipes with respective different height are disposed corresponding thereto, since the upper heating zones are also heated by the lower heating zones, the temperature of the side wall of a certain closed-end pipe disposed at a higher position may sometimes be higher than the temperature at the top end thereof. Then, with respect to this certain closed-end pipe, the temperature at the side wall (highest for the closed-end pipe) is measured instead of the intended temperature at the top end. For instance, where $T1 > T2$, a detector disposed corresponding to T2 does not accurately detects T2 but indicates a value nearer to T1.

In order to correct this type of error, heat radiated from the side wall to the optical fiber should be subtracted from the total heat radiated thereto. Specifically, the output due to the radiation heat from the side wall at the temperature T1 should be subtracted from the output of the detector corresponding to the temperature T2. In this case, it is assumed that the temperature at the top end of the shortest (lowest) closed-end pipe is higher than the temperature at the side wall thereof and the temperature T1 can actually be detected as an exact value.

Then, when the temperature T2 is obtained in this way, temperature T3 can be obtained by compensating the output from the next detector using the temperature T1, T2. Then, by repeating such operating procedures, the temperature from T1 at the top end of the shortest closed-end pipe to TN at the top end of the longest closed-end pipe can be measured at a high accuracy.

Figure 5:
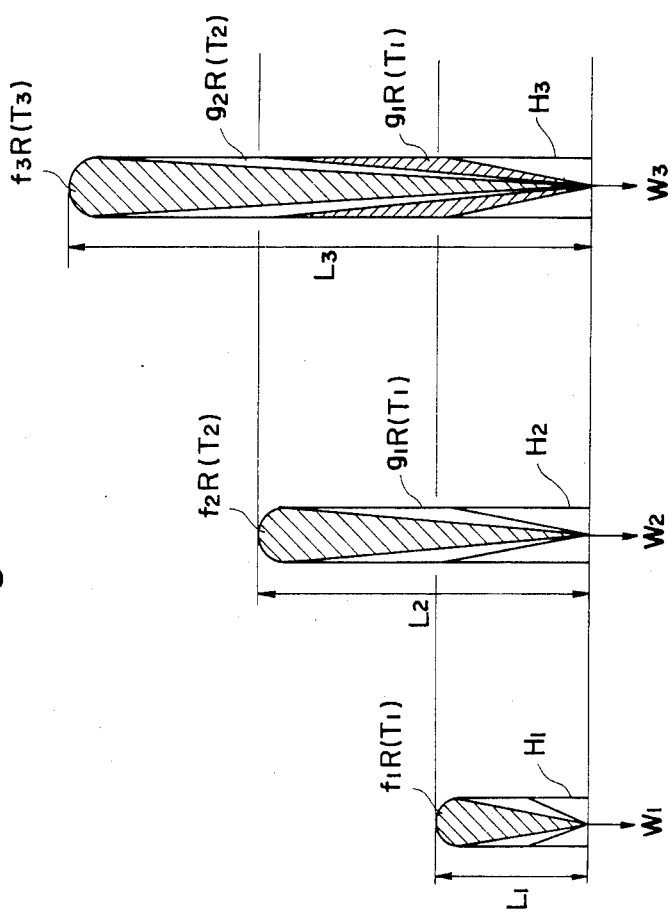
FIG. 5 is an explanatory view for the compensating method according to this invention.

Brief description will be made for this compensating method with an aid of the drawings. In FIG. 5, since the temperature at the top end is sufficiently higher than the temperature at the side wall in a closed-end pipe H1 of the shortest length L1, the heat radiation power W1 incident to the optical fiber is composed only of the radiation heat from the top end and the following equation is established:

$$W1 = f1 R(T1) \quad (1)$$

where f1 is a configuration coefficient as viewed from the incident end face of the optical fiber to the top end of the shortest closed-end pipe H1, and R(T1) is a heat radiation power from a target at temperature T1.

Since W1 and f1 are known in the equation (1), R(T1) can be calculated.

Then, the temperature T1 is determined from R(T1) by using the following relationship (2):

$$R(T_1) = \int_{\lambda_1}^{\lambda_2} \frac{C_1}{\lambda^5} \left( e^{\frac{C_2}{\lambda T_1}} - 1 \right)^{-1} d\lambda \quad (2)$$

where
$\lambda 1, \lambda 2$: upper and lower limits for the detection wavelength
$\lambda$: wavelength for the radiation heat
C1, C2: first and second Planck's constants Although the relationship (2) can not directly be solved with respect to T1, it is easy to determine the temperature T1 from R(T1) by previously preparing a numerical table for the relationship between R(T1) and T1.

In this way, the temperature T1 at the top end of the closed-end pipe H1 can be determined with a high accuracy merely by by means of the data for the heat radiation power W1 incident to the optical fiber.

The configuration coefficient f1 can be calculated based on the length and the inner diameter of the closed-end pipe H1 and the core diameter of the optical fiber.

The configuration coefficient generally expressed as fi can be determined depending on the configuration at the top end of the closed-end pipe by the following equations respectively:

(a) Flat top end (refer to FIG. 6(a)):

$$f_i = 2\pi L_i \int_0^{\mathrm{Tan}^{-1}\frac{r}{L_i}} \frac{\sin\theta}{\cos^2\theta} \left\{ 1 - \frac{L_i^4}{(a^2\cos^4\theta + L_i^2)^2} \right\} d\theta$$

where
L: length for the cylindrical portion of closed-end pipe
2r: inner diameter of closed-end pipe
2a: core diameter of optical fiber (b) Spherical top end (refer to FIG. 6(b))

$$f_i = 2\pi r^2 \int_0^{80°} (1 - \cos^4\phi)\cos\left(\frac{\pi}{2} - \phi - \mathrm{Tan}^{-1}\frac{r\cos\phi}{r\sin\phi + L_i}\right) \times \cos\phi \, d\phi$$

where $\cos\phi = \dfrac{L^2 + 2Lr\sin\phi + r^2}{\sqrt{(L_i^2 + 2L_i r\sin\phi + x^2)^2 + a^2(r\sin\phi + L_i)^2}}$ and L, 2r and 2a represent the same meanings as described above.

(c) Conical top end (refer to FIG. 6(c))

$$f_i = \frac{2\pi \sqrt{X^2 + r^2}}{X} \int_0^r (1 - \cos^4\phi) \cos\left(\frac{\pi}{2} - \mathrm{Tan}^{-1}\frac{r}{X} \, \mathrm{Tan}^{-1}\frac{tX}{X^2 + L_i X - rt}\right) t \, dt$$

-continued $$\text{where } \phi = \text{Tan}^{-1} \frac{(X^2 + 2L_iX - rt)ta}{X}$$

X: length for the conical portion (height)
t: distance from the center line to the point A
h: height from the bottom of the cone to the point A
L, 2r and 2a represent the same meanings as described above.

Next, consideration is made for the case of measuring the temperature T2 at the top end of the closed-end pipe H2 having a length L2 by using a power W2 incident from the closed-end pipe to the optical fiber.

Assuming in this case that the portion (L2−L1) of the closed-end pipe H2 is at the temperature T1, heat radiation power represented by the following equation is incident to the optical fiber:

$$W2 = f2R(T2) + g1R(T1) \tag{8}$$

where f2, g1 are configurational coefficients as viewed from the incident end face of the optical fiber to the top end and the side wall at the portion (L2−L1) of the closed-end pipe H2, which are the constants determined by the length and the inner diameter of the closed-end pipe H2 and the core diameter of the optical fiber and, by referring to FIG. 6(d), represented as:

$$g_i = 2\pi r^2 \int_{\text{Tan}^{-1}\left(\frac{r}{L_i}\right)}^{\text{Tan}^{-1}\left(\frac{r}{L_i+1}\right)} \frac{1}{\cos\theta} \left\{ 1 - \frac{16r^4}{(a^2\sin^2 2\theta + 4r^2)^2} \right\} d\theta$$

Since W2, f2, g1 are known in the equation (3) and R(T1) is obtained from the shortest closed-end pipe H1 according to the foregoing description, R(T2) can be determined and the temperature T2 at the top end can be determined in the same manner as in the equation (2).

Considering now the case of measuring the temperature T3 at the top end of the closed-end pipe H3 having a length L3 by using a power W3 incident from the closed-end pipe H3 to the optical fiber, while assuming the temperature at the portion (L3−L2) as T2 and the temperature at the portion (L2−L1) as T1, a power represented by the following equation (4) is incident to the optical fiber:

$$W3 = f3R(T3) + g2R(T2) + g1R(T1) \tag{4}$$

where f2, g2 are configuration coefficients as viewed from the incident end face of the optical fiber to the top end and the portion (L3−L2) of the third closed-end pipe H3, which are the constants determined by the length and the inner diameter of the closed-end pipe H3 and the core diameter of the optical fiber.

Since W3, f3, g2, g1 are known in the equation (4) and R(T1), R(T2) are determined from the closed-end pipes H1 and H2, R(T3) can be obtained and the temperature T3 can be determined in the same manner as described above.

By measuring the radiation temperature considering the heat radiation from the side wall in this way, the temperatures T1, T2, T3 for the upper, middle and lower zones can be measured at a high accuracy.

The foregoing equations (1), (3) and (4) can be described by the following matrix:

$$\begin{pmatrix} W_1 \\ W_2 \\ W_3 \end{pmatrix} = \begin{pmatrix} f_1 & 0 & 0 \\ g_1 & f_2 & 0 \\ g_1 & g_2 & f_3 \end{pmatrix} \begin{pmatrix} R(T_1) \\ R(T_2) \\ R(T_3) \end{pmatrix} \tag{5}$$

Although this is explained in terms of three heating zones, this method can be applied similarly to four or more heating zones or to a case where temperature measurement is to be carried out in a more accurate manner by increasing the number of closed-end pipes and using a plurality (n) of closed-end pipes of different length for the measurement at a plurality (n) of positions. In this case, the foregoing equation (5) can be generalized as:

$$\begin{pmatrix} W_1 \\ W_2 \\ W_3 \\ W_4 \\ \vdots \\ W_n \end{pmatrix} = \begin{pmatrix} f_1 & 0 & 0 & 0 & \cdots & 0 \\ g_1 & f_2 & 0 & 0 & \cdots & \\ g_1 & g_2 & f_3 & 0 & \cdots & \\ g_1 & g_2 & g_3 & f_4 & & \\ \vdots & & & & \ddots & 0 \\ g_1 & g_2 & g_3 & & g_{n-1} & f_n \end{pmatrix} \begin{pmatrix} R(T_1) \\ R(T_2) \\ R(T_3) \\ R(T_4) \\ \vdots \\ R(T_n) \end{pmatrix} \tag{6}$$

That is, the following equation:

$$T = \frac{W}{F}, \quad T = F^{-1}W \tag{7}$$

can be obtained and the temperatures at the various position (n) can be measured according to this equation.

In the method of compensation as described above, it is assumed that the temperatures at the side walls of closed-end pipes form a stepwise distribution such that the temperature for the portion (L2−L1) is T1 and the temperature for the portion (L3−L2) is T2 and so forth as shown in FIG. 7(a). However, since this assumption does not always agree with the actual situation, another assumption which more closer to the actual condition is used for the compensation.

Figure 7B:
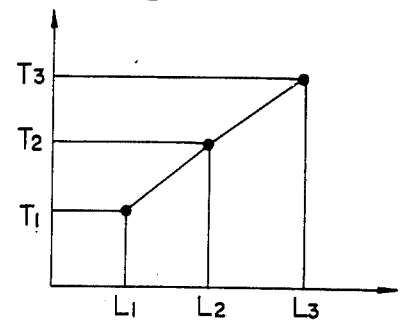

In this assumption, it is considered that the temperature at the side wall portion (L2−L1) increases linearly from T1 to T2 as shown in FIG. 7(b).

Standing on such an assumption, a function G1(T1,T2) considering the temperature slope between (L2−L1) is introduced instead of the g1R(T1) in the above equation (3) for the amount of the heat radiation incident from the portion (L2−L1) to the optical fiber as:

$$G_1(T_1,T_2) = 2\pi r^2 \int_{\lambda_1}^{\lambda_2} \int_{\text{Tan}^{-1}\left(\frac{L_1}{r}\right)}^{\text{Tan}^{-1}\left(\frac{L_2}{r}\right)} \frac{1}{\cos\theta} \left\{ 1 - \frac{16r^4}{(a^2\sin^2 2\theta + 4r^2)^2} \times \frac{C_1}{\lambda^5} \left( e^{\frac{C_2}{\lambda T^4}} - 1 \right)^{-1} \right\} d\lambda d\theta$$

-continued where $T^4 = \dfrac{T_2 - T_1}{L_2 - L_1}(r\tan\theta - L_1) + T_1$ where
- 2r: inner diameter of closed-end pipe
- 2a: core diameter of optical fiber
- λ: wavelength of the heat radiation
- λ1,λ2: upper and lower limits of the detection wave length
- ∥ θ: angle viewed upwardly from the center of the incident angle of the optical fiber to the side wall (view angle)
- C1,C2: first and second radiation constants That is, the foregoing equation (3) can be rewritten as:

$$W2 = f2 R(T2) + G1(T1,T2) \quad (3)'$$

In the same manner, the equation (4) can be rewritten as:

$$W3 = f3 R(T3) + G2(T1,T2) + G2(T2,T3) \quad (4)'$$

Then, with respect to the $n_{th}$ closed-end pipe, it can generally be rewritten as:

$$Wn = fn\, R(Tn) + \sum_{k=1}^{n-1} G_k(T_k, T_k + 1) \quad (5')$$

Since $\sum_{k=1}^{n-1} G_k(T_k, T_k + 1), fn\, Wn$ is known, R(Tn) can be determined and, accordingly, temperature Tn at the top end of the $n_{th}$ closed-end pipe can be determined from the equation (2).

Each of the methods of the compensation as described above can be carried out by a computer for the compensating calculation, the compensated temperature at the top end for each of the closed-end pipes is displayed on a display device and the temperature distribution within the furnace of the hot isostatic pressing apparatus can be measured at a high accuracy.

In the system of transmitting radiation temperature information on a target by means of an optical fiber, if contamination is resulted to the incident end face of the optical fiber opposed to the target, it will decay the amount of light incident to the optical fiber and thus cause noises upon treating the temperature information. For instance in the measurement of the radiation temperature by using the optical fiber, if the incident end face of the fiber is contaminated to result in the decay in the amount of light, the temperature finally indicated is made lower than its actual value. The measurement error in the temperature may be decreased by the use of a two color thermometer in the case where the transmission characteristic of the contamination is less wavelength dependent. However, if the wavelength dependency is large, an inevitable error is introduced in the measurement for the temperature. In view of the above, it has been necessary to clean the incident end face of the optical fiber by means of wiping or flowing a purge gas.

Japanese Patent Laid-Open No. 7530/1983 discloses a method of compensating the optical contamination by the use of a reference light. In this system, an infrared ray is irradiated to a phosphorus body used as the standard temperature radiant body and optical transmission loss is compensated due to the intensity of the reflection light. However, in the case of the measurement for the radiation temperature, since the intensity of infrared rays radiated from the target is large, it is impossible to use the infrared ray as the reference light. In addition, since the distance between the incident end face of the optical fiber and the target is extremely large as compared with the case of the phosphorus radiant body method, the detection of the reflection light itself is difficult.

In a preferred embodiment of this invention, a reference light from an additional optical fiber is applied to the incident end face of the measuring optical fiber opposed to the target. The reference light picked-up together with the radiation energy from the target is sent through the measuring optical fiber, and then separated from the radiation light from the target to determine the transmittance of the optical fiber for guiding the radiation energy based on the intensity of the transmitting reference light. Then, the optical information concerning the radiation energy from the target is compensated due to the transmittance to thereby eliminate the measuring error in the temperature caused by the contamination to the incident end face of the optical fiber.

In the preferred embodiment of this invention the contamination error can be compensated not by physical cleaning such as wiping or gas purging to the contaminated incident end face of the optical fiber but by the use of a reference light, followed by compensating mathematical operation. Accordingly, maintenance for the hot isostatic pressing apparatus can greatly be facilitated and accurate temperature measurement is enabled for a long period of time with no aging change.

In a further modified embodiment of this invention, the reference light from the light source is introduced directly into the measuring optical fiber and utilized for the compensation while being transmitted through the path and reflected at the incident end face of the measuring optical fiber. In this modified method, no additional optical fiber for introducing the reference light is necessary to make a much contribution for the simplification of the system construction.

DESCRIPTION OF SPECIFIC EMBODIMENTS ILLUSTRATED IN THE DRAWINGS

(1) Fundamental Embodiment Using Single Closed-End Pipe

A fundamental embodiment of the apparatus for practicing the method according to this invention will now be described more specifically referring to the accompanying drawings.

FIG. 8A shows one embodiment of the apparatus for measuring the temperature according to this invention, in which a hot isostatic pressing apparatus comprises a high pressure cylinder 1 incorporating therein a heat insulation layer 2, a heater not illustrated and lower and upper bottom covers 3A, 3B on which a specimen bed 4 is placed. To the inside of the furnace defined by the insulation layer 2, is disposed a single closed-end pipe 5 such that the top end of which is situated at a portion to be measured. The heat radiated from the top end of the closed-end pipe 5 is led externally through an optical fiber 6 disposed to the lower opening of the closed-end pipe 5 at the bottom of the furnace and the optical fiber 6 is connected to a measuring system comprising a radiation thermometer 7.

The radiation light led to the outside of the furnace is converted into temperature by means of known luminance-temperature conversion or two color temperature operation.

In the drawing, are further shown a holder 8 for the optical fiber 6, fiber connectors 9, a top cover 10 and a pressure-equalizing hole 11 to be described later.

Although the optical fiber 6 is led out to the outside of the furnace through the upper bottom cover 3B in the drawing, it may also be led out passing through the heat insulation layer 2 and the high pressure cylinder 1 and from the top cover 10 (refer to the dotted chain in FIG. 8A). In the case of suspending the heat insulation layer 2 or the like from the top cover 10, the closed-end pipe 5 may be inserted from above downwardly to the inside of the furnace as shown in FIG. 8B.

The optical fiber may be covered with metal in the present embodiment. The metal cover is applied either by metal coating or as a metal sheath. The metal usable for the metal coating can include, for example, Al, Cu, Co, Ni, Mo, W, Pd, Pt that can form a suitable alloy to be chemically stable with Si which is a constituting component of the $SiO_2$ optical fiber. Among them, aluminum is most ordinary metal. The metal usable as the metal sheath can include almost kinds of metals such as Fe, Ti, Cu, Zn, Pb, Sn, Al, Cr, Co, Ni, Mo, W, Pd and Pt. As the material for the rod-like optical member, quartz, sapphire or like other material having similar heat radiation power transmission performance can be mentioned. The rod-like optical member may also be applied with the metal cover.

Figure 9B:
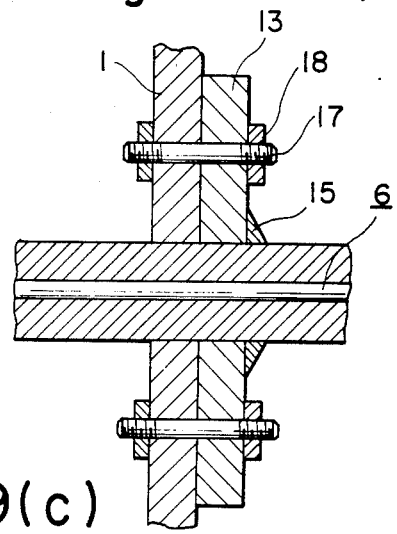
Figure 9C:
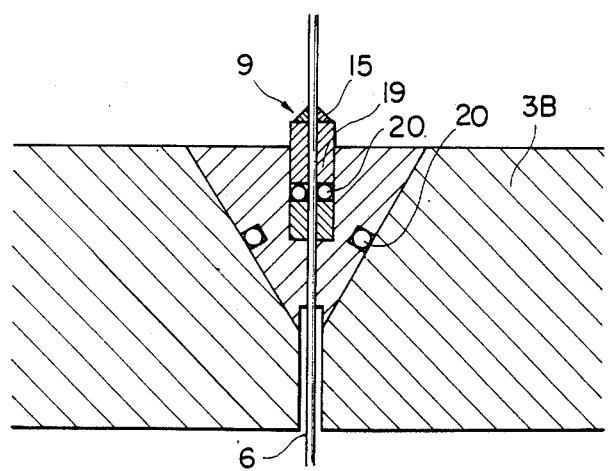

Upon leading out the optical fiber from the furnace through the structural component thereof, tight sealing is indispensable between the furnace component and the optical fiber. FIGS. 9(a), (b), (c) show respective modes of such sealings in which an optical fiber 6 is led out through the wall of the high pressure cylinder 1 (FIG. 9(a)) and a metal plate 13 secured thereto by means of brazing or welding 14, 15. In this case sealing (e.g., brazing) at the led out portion of the optical fiber 6 can be applied with ease since the optical fiber 6 has a metal coating 16 formed therearound. The metal plate 13 may also be secured to the furnace body (cylinder) by other means such as bolts 17 and nuts 18 (FIG. 9(b)). FIG. 9(c) illustrates a modified sealing mode for leading out the optical fiber through the upper bottom cover 3B, which is an enlarged view for a part of FIG. 8A. In this embodiment sealing can further be improved by the use of a metal support member 19 and O-ring 20. Final sealing for the optical fiber 6 is applied also by the brazing 15 between the metal support member 19 and the metal coating of the fiber 6.

Further, FIGS. 10(a), (b), (c) show other respective embodiments of the apparatus for practicing the method of measuring the temperature according to this invention, in which a closed-end pipe 5 for measuring the radiation temperature made of heat resistant material is disposed to the inside of the specimen bed 4 made of heat insulating material for the power control of the lowermost heater 12.

Figure 11B:
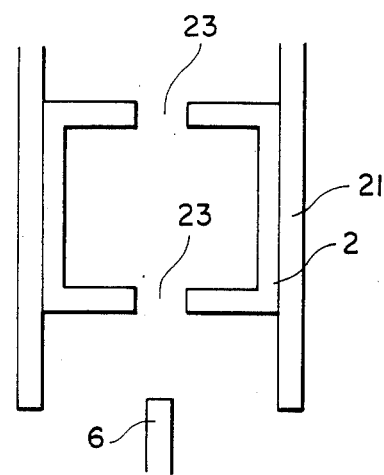
Figure 11C:
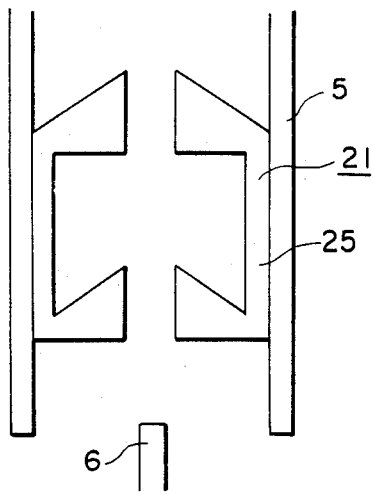
Figure 11D:
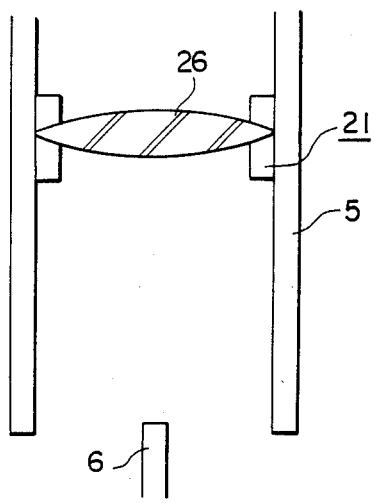

FIGS. 11(a), (b), (c), (d) show respective embodiments of a collimator 21 attached to the pipe so that only the heat radiated from the portion to be measured can be picked-up reliably, in which FIG. 11(a) shows an embodiment having two discs 22,22 each with a pin hole attached to provide a cavity effect by the two discs. FIG. 11(b) shows another embodiment in which small apertures 23 are perforated at the center of a hollow cylindrical member 24, by which the cavity effect can be improved more as compared with the previous embodiment (a) by increasing the radiation rate at the inside of the hollow cylinder 24. FIG. 11(c) shows a further embodiment, in which each of the upper face and the inner bottom face of a cylindrical member 25 is fabricated into a conical shape, by which the dusts such as those detached from the pipe wall are kept on the upper or inside portion of the collimator 21 to prevent the contamination for the incident end face of the optical fiber 6. FIG. 11(d) shows a still further embodiment, in which a collimator 21 has a lens 26 for effectively collecting only the radiated heat from the top end of the closed-end pipe 5.

In the apparatus of this invention, it is also important to dispose a pressure—equalizing hole to the closed-end pipe 5 so as to equalize the pressure between the inside of the closed-end pipe 5 and the inside of the furnace, so that the closed-end pipe 5 may not be destructed by the pressure difference between the inside and the outside of the pipe wall.

FIGS. 12(a), (b) show respective typical arrangements of the pressure-equalizing hole, in which a pressure-equalizing hole 27 is formed at a position nearest possible to the top end of the closed-end pipe 5 within a range not contained in the view angle as viewed from the end face of the optical fiber 6. If the hole 27 is contained in the extent of the view angle, radiation from the heater or the heat insulating layer of the hot isostatic pressing apparatus intrudes into the radiation light from the top end of the closed-end pipe 5 to cause an error in the temperature measurement.

In this embodiment (a), since the change of the density of the gaseous medium in the inside of the closed-end pipe concentrates to the top end to reduce the fluctuation of the optical path near a lens 28, the temperature at the top end of the closed-end pipe 5 can be measured with a high degree of accuracy.

In a case where the area of the pressure-equalizing hole 27 is negligibly small as compared with that for the extent of the view angle at the top end of the closed-end pipe 5, the hole 27 may be formed at the top end of the closed-end pipe 5 with satisfactory effect.

Further, a filter may desirably be disposed to the pressure-equalizing hole 27 so that dusts contained in the gaseous medium inside of the furnace may not intrude into the inside of the closed-end pipe 5 thereby contaminating the lens 28 situated below. If the filter is made of such porous material which would hinder the intrusion of the light outside of the closed-end pipe into the pipe, the hole 27 can be formed at a position contained in the extent of the view angle.

Figure 12B:
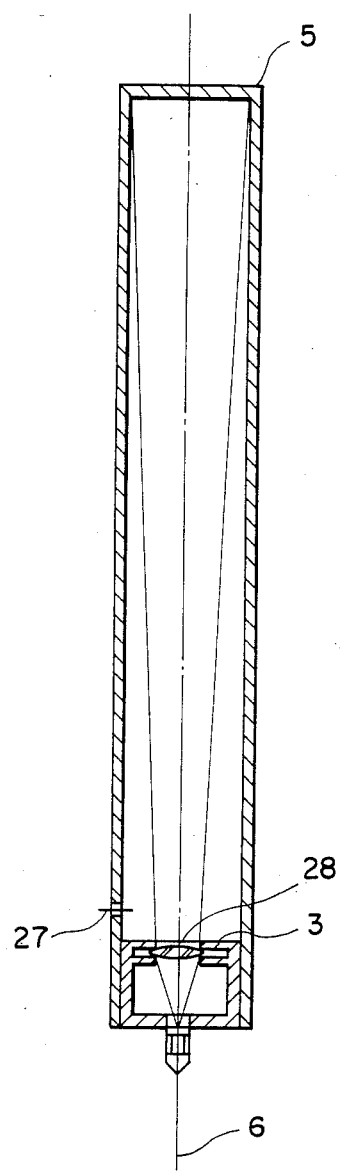

FIG. 12(b) shows another arrangement in which the pressure-equalizing hole 27 is formed near the bottom of the closed-end pipe 5. In this embodiment, contamination of the lens 28 can be reduced since the furnace gaseous medium is at a relatively lower temperature therefore a less degree of dust content intrudes to the inside of the closed-end pipe 5. In this case, provision of a filter is desirable for the prevention of the contamination resulted to the lens 27 with the dusts.

In a case where the closed-end pipe 5 is made of porous material such as graphite or boron nitride, provision of the pressure-equalizing hole may be dispensed since the pipe itself is gas permeability to some extent.

Furthermore, the pressure-equalizing hole 27 may be apertured through the optical fiber holder 8 as shown in FIG. 13.

FIGS. 14(a), (b), (c), (d) show the details for each of the embodiments of the optical fiber holder 8 for holding the optical fiber 6 at the opening, that is, at the bottom end of the closed-end pipe 5.

The optical fiber 6 is inserted into a cylindrical fiber holder 8 and secured therein by pouring adhesives or the likes from a pouring hole 29 as shown in FIGS. 15(a), (b). The optical fiber 6 may of course be secured by screwing or other like means. The fiber holder means 8 is secured to the bottom end of the closed-end pipe 5 by means of screwing or adhesives.

In the embodiment shown in FIG. 14(a), the top end of the optical fiber 6 is protruded out of the holder 8 and secured in the structure as described above, by which those dusts which may have detached and fallen in the closed-end pipe 5 can be prevented from depositing on the incident top end face of the optical fiber 6.

Figure 14B:
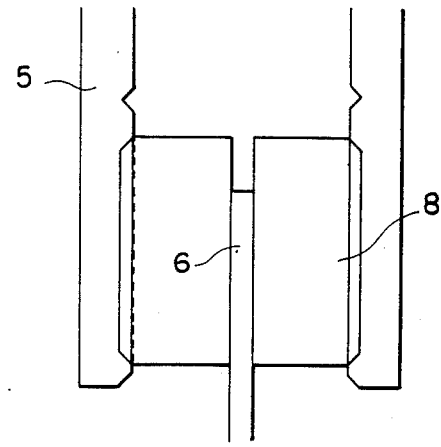
Figure 14C:
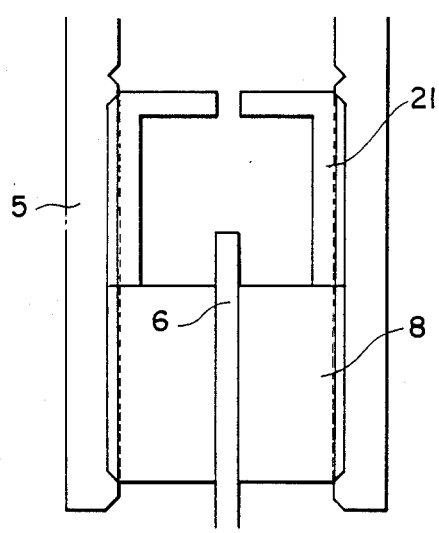

In FIG. 14(b) the top end of the optical fiber 6 is embedded to the inside of the holder 8 in the manner opposite to the above-described embodiment (b), by which the view angle of the optical fiber 6 (usually 24° for the quartz fiber) is restricted and only the light from the top end of the closed-end pipe 5 enters to the optical fiber 6. As the result, the radiation light from the side wall of the closed-end pipe 5 having the foregoing temperature distribution does not enter the optical fiber 6 thereby improving the temperature measuring accuracy. FIG. 14(c) shows another embodiment, in which the collimator 21 as described above is disposed at the top end of the holder 8 and the collimator 21 is in the form of a cylindrical cap having a small hole at the center.

The embodiment (c) of this structure has combined advantages in the embodiments (a), (b) as described above.

Figure 14D:
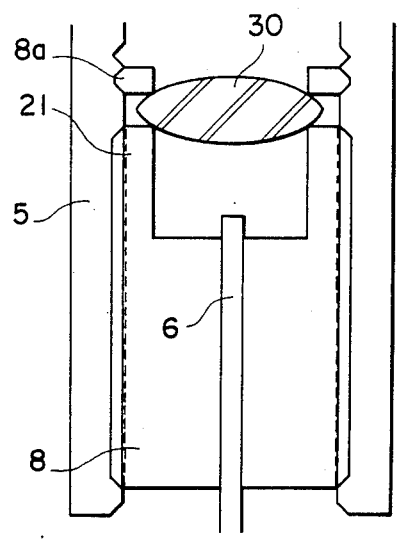

FIG. 14(d) shows a still further embodiment of a structure in which a lens 30 is mounted as the collimator to the top end of the holder 8 so as to collect a large amount of light. The protrusion 8a for supporting the lens 30 may be integrated with the holder main body 8 situated below.

In this way, the optical fiber 6 is led out to the outside of the furnace while passing through the collimator 10, holder 8 or the like and connected to a radiation thermometer 7 as shown in FIG. 16.

FIGS. 17(a), (b), (c) are block diagrams for the portion of this invention which convert the radiation light into temperature by means of the radiation thermometer 7 and then displaying the same.

In this embodiment, a chopper is employed for obtained an optoelectronic conversion output as AC signals that can be amplified with ease, and they are sent therefrom together with reference signals to a lock-in amplifier comprising each of the sections as shown in the block diagram, where they are mathematically processed in a predetermined electronic and electrical processing circuit and displayed as the temperature.

FIG. 18 shows a principle of radiation temperature measuring method employed in the present system.

The energy E1 incident to the lens is expressed as:

$$E_1 = K \int_0^\infty W(\lambda)d\lambda \quad (1)$$

where $$W(\lambda) = \frac{C_1}{\lambda^5}\left(e^{\frac{C_2}{\lambda T}} - 1\right)^{-1} \quad (2)$$

$W(\lambda)$: divergence of spectral emission $(W \cdot m^{-3})$
: wavelength (m)
T: temperature (K)
C1: $3.74 \times 10^{-16}$ $(W \cdot m^2)$
C2: $1.44 \times 10^{-2}$ $(m \cdot k)$ The photoelectronically converted output E2 is expressed as:

$$E_2 = K \int_{\lambda_1}^{\lambda_2} W(\lambda)R(\lambda)F(\lambda)D(\lambda)d\lambda \quad (3)$$

where
$L(\lambda)$: spectral transmittance of lens
$F(\lambda)$: spectral transmittance of optical fiber
1, 2: transmittance wavelength of optical fiber
$D(\lambda)$: sensitivity of photoelectronic conversion element Further, the output from the main amplifier E3 is expressed as:

$$E_3 = G_1 G_2 K \int_{\lambda_1}^{\lambda_2} W(\lambda)R(\lambda)F(\lambda)D(\lambda)d\lambda \quad (4)$$

where G1: pre-amplifier gain, G2: main amplifier gain.

In the equation (4) the temperature T at the target is included as $W(\lambda)$, that is, in the form of the equation (2). Accordingly, there exists a 1:1 correspondence between T and E3, in which T can also be determined from E3, for instance, by previously preparing a calculation table for E3 based on each temperature T. That is, the output voltage E3 from the main amplifier can be transformed into the temperature T for the target to be measured.

In this measuring system a pre-amplifier is disposed in the vicinity of the photoelectronic conversion device serving to reduce the impedance of the conversion device, avoid the intrusion of external noises and amplify the weak output voltage from the conversion device with low level of noises.

Further, while the foregoing description has been made to the use of a single optical fiber, a bundle of optical fibers or a rod-like optical material can also be used as described above. Furthermore, the closed-end pipe having the optical fiber inserted therein may also be disposed by a plurality such that the vertical temperature distribution can, for example, be detected with each of the portions in the furnace.

In the furnace of the hot isostatic pressing apparatus, since ohmic type heater members are disposed in a cylindrical manner vertically as a heating source to the inside of the furnace and the convection of the pressurized high density gaseous medium is resulted due to the heat from the heater members, the distribution of the optical deflection ratio may be fluctuated due to the convection to possibly enter the heat radiation other than that from the target to the optical fiber if the temperature is measured by merely using the protrusion extended from the heater or the like as the target. However, by the method of measuring the temperature according to this invention, since the closed-end pipe is used and the optical fiber is confined therein, temperature can be measured within the closed-end pipe free from substantial effect of the convection and with no effect of the change in the optical deflection, by which the measuring accuracy can be improved.

Further, since the incident end face of the optical fiber is confined within the closed-end pipe, the contamination resulted to the end face of the optical fiber due to the dusts or the likes emitted from the heater or the specimen can be decreased to reduce the aging change in the measuring accuracy. In addition since there is no requirement for the conventional optical window, the improved structural safety of the furnace can be attained.

Furthermore, by setting the detection wavelength to a shorter side, the temperature accuracy can be improved as described above and, by varying the detection wavelength, the range for the temperature measurement can be widened.

Furthermore, this invention can also be applied to a pressurized sintering furnace having the same function as that of the hot isostatic pressing apparatus.

(2) Modified Embodiment Using a Plurality of Closed-End Pipes

The method of the measuring the temperature distribution according to this invention will now be described by way of a specific system while referring to FIGS. 19 through 26.

In one embodiment illustrated in FIG. 19, a plurality of closed-end pipes 32 are disposed passing through the furnace wall 31 of a high pressure vessel. Detectors 33 each including photoelectronic conversion devices are disposed at the opening of the closed-end pipes respectively and heat radiation from the top ends of the closed-end pipes 32 are converted into electrical signals, which are amplified in amplifiers 34 and then introduced into a computer 35, where the foregoing mathematical processing, for the calculation of the equation (3) along with the conversion from R(T) to T are performed, and the temperatures at the top ends of the closed-end pipes 32 are displayed respectively on display devices 40.

However, as also described previously, it is actually impossible in a case where the pressure in the inside of the furnace is as high as 2000 atm and the temperature is nearly 2000° C., to extend the closed-end pipes through the furnace wall 11 to the outside of the furnace in view of the pressure-proof sealings.

In view of the above, as shown in FIG. 20, the closed-end pipes 32 are entirely enhoused and secured to a high pressure furnace at the inside of a heat insulation layer 37 within the furnace wall 31 of a high pressure vessel, the heat radiation from the top end of the closed-end pipes 32 is led by way of optical fibers 36 disposed to the openings for the closed-end pipes 32 through the vessel cover (lower cover 38 in the illustrated embodiment), to the outside of the furnace and then measured by means of a measuring system including detectors 39 and a computer 41.

In this case, radiation heat led out to the outside of the furance is usually measured by a radiation thermometer including photoelectronic conversion device composed of Si photodiodes or the likes and then converted into temperature by a known luminance-temperature conversion and two colors temperature operation.

Detection wavelength for the radiation thermometer of between 0.3–0.6 um is effective in view of the measurement.

FIG. 21 is a block diagram showing the detail of the computer 41, etc for the mathematical operation of the temperature distribution in each of the systems showing that heat radiation from each of the closed-end pipes 32 is detected, and then calculated through digital counting mode by means of predetermined electric or electronic processing circuits designed conventionally and then displayed as the temperature.

FIGS. 22(a), (b) illustrate a specific embodiment of a heating device of a three-zones heating system for a hot isostatic pressing apparatus. In this case, the temperature for each of the three-zones have to be measured in order to control the electrical power supplied to the heaters 41, 42, 43 for upper, middle or lower zones. In view of the above, three closed-end pipes 44, 45, 46 are disposoed vertically such that the top ends thereof may be situated at each of the temperature measuring points for the upper, middle and lower heaters 41, 42 and 43 in FIG. 22(a). In another embodiment shown in FIG. 22(b), a heat resistant material 47 incorporating three hollow portions 48, 49, 50 with the length corresponding to each of the temperature measuring points for the upper, middle, lower zones is used instead of the three closed-end pipes. The latter structure is particularly advantageous in view of the mechanical strength, ease of mounting and handling. The insertion portion conventionally used for the thermocouples in the existent hot isostatic pressing apparatus can also be utilized desirably.

FIGS. 23(a), (b), (c) show one embodiment for manufacturing the closed-end pipe as illustrated in FIG. 22(b), in which FIG. 23(a) is a front elevational view, (b) is a upper plan view and (c) is a side elevational view. A support member 51 is divided into a plurality parts 51a, 51b, 51c and 51d, which are fitted integrally to each other as shown in FIG. 23(c) into an integral closed-end pipe.

In this invention, the closed-end pipes are disposed in accordance with each of the embodiments and detectors are connected directly or by means of optical fibers to the openings of the closed-end pipes, for practicing the method of measuring the temperature according to this invention as schematically show in the flow chart of FIG. 24. The temperature T at the top end of the closed-end pipe is displaced by means of the input of heat radiation power, the calculation and the reference to the calculation table. Then, the step is returned to the start of the flow for the continuous measurement to surely and reliably conduct the temperature control in the hot isostatic pressing treatment.

Simulated experiment according to this invention will be shown with numerical values. Experiment was conducted by using optical fibers each of 400 um core diameter disposed in each of a closed-end pipes 1 m length and 1 mm inner diameter, where the temperature of 2000° C. at the top end was gradually changed linearly to the temperature of 500° C. at the lower opening of the closed-end pipe.

As the result, measurement errors for the temperature:

about 200° C. at the detection wavelength of 0.9 $\mu$m, and about 20° C. at the detection wavelength of 0.4 $\mu$m were resulted relative to the temperature of 2000° C. at the top end by means of a simple temperature conversion method based on the total heat radiation power (energy) from the top end and the side wall of the closed-end pipes incident to the optical fibers. However, it was found that these errors could be eliminated and the effect of the side wall temperature be cancelled by using the foregoing compensating method of this invention.

Furthermore, the change of the heat radiation power incident to the optical fiber was examined while setting the temperature at the lower end of the closed-end pipe to 300° C. and varying the temperature at the top end of the closed-end pipe within a range between 1000°–2500° C. (refer to the solid line in FIG. 25). In this case, it was assumed that the middle portion of the closed-end pipe had a temperature slope as shown by the dotted line in FIG. 25 that linearly connects the temperature at the top end and the temperature at the lower end of the closed-end pipe.

The result was as shown by the dotted line in FIG. 26.

Then, in the case of an actual calibration for the entire temperature measuring system, it is considered such a case that the top end is heated to a temperature higher by 200° C. than the temperature at the central portion of the closed-end pipe while assuming that a real calibration curve corresponding to the dotted line in FIG. 26 is obtained. If the temperature at the top end is 1500° C., the radiation power shown is increased by the amount P' in the graph under the heating at the central portion to arrive at the position shown by the solid line in FIG. 26.

Accordingly, if the increased radiation energy, that is, the radiation power is converted into the temperature as it is along with the dotted line in FIG. 26 with no compensation, it would indicate a temperature of about 1700° C.

That is, this temperature output corresponds about to the temperature at the central portion to result in an error of about +200° C. relative to the temperature of 1500° C. at the top end failing to obtain an accurate temperature distribution within the furnace and cause an irregularity in the processing temperature of the hot isostatic pressing apparatus.

Such an error can be eliminated by the compensating method according to this invention.

Specfically, according to the method of this invention, a plurality of closed-end pipes with different length are disposed in the high pressure furnace of the hot isostatic pressing apparatus, heat radiation from the inner wall of the closed-end pipes is detected at the opening of the closed-end pipes and are subjected to a mathematical procession, in which the measuring error for the temperature due to the stray light from the side wall of the closed-end pipes is compensated to take out only the heat radiation power from the top end of the closed-end pipes for the measurement of the temperature distribution within the furnace. Accordingly, measurement error in the temperature due to the stray light from the side walls of the closed-end pipes can be decreased to improve the measurement accuracy, whereby the temperature distribution within the furnace of the hot isostatic pressing apparatus can be made uniform, thus providing a usefulness upon applying the hot isostatic pressing apparatus to a further generalized application uses.

(3) Embodiment for Compensating Contamination Error

As described above, measuring error in the temperature due to the contaminations on the incident end face of the optical fiber is compensated in this invention without actual cleaning for the fibers.

In one embodiment of this method, use of a reference light from a reference light source is essential and the reference light therefrom is modulated and separated in two directions, one of which is monitored and the other of which is passed through an additional optical fiber and radiated from the end face thereof to the incident end face of the temperature measuring optical fiber opposing to the target. In this case, radiation energy from the target also passes as a signal light to the opposing end face of the measuring optical fiber and then transmitted together with the reference light through the measuring optical fiber and then taken out.

The energy thus transmitted and taken out is separated depending on the modulation frequency and outputted through respective synchronized lock-in amplifiers. Then, the radiation energy of the target passing through the incident end face of the measuring optical fiber opposed to the target and the intensity of the light passing through the exit end face of the reference light optical fiber and the incident end face of the temperature measuring optical fiber are measured, and compared with the strength of the monitored light, whereby the transmittance including the optical decay at the incident end face of the temperature measuring optical fiber can be determined. Specifically, the intensity of the light IrB transmitting through the end face of the reference light optical fiber modulated by an angular frequency $\omega r$ is represented as:

$$I_{rB} = \frac{(1 - \rho - \alpha)I}{2} (1 + \cos \omega_r t) \qquad (1)$$

where the reflection factor $\rho$ and absorption factor $\alpha$ are considered identical for both of the end faces of the temperature measuring optical fiber since they are within the identical atmosphere, I represents the reference light intensity and W represents the signal light intensity due to the radiation energy from the target.

Further, intensity IrA of the reference light passing through the end face of the temperature measuring optical fiber is represented as:

$$I_{rA} = \frac{(1 - \rho - \alpha)^2 I}{2} (1 + \cos \omega_r t) \qquad (2)$$

While on the other hand, the intensity IsA of the radiation energy from the target passing through the end face of the temperature measuring optical fiber is represented as:

$$I_{sA} = (1 - \rho - \alpha)W \qquad (3)$$

Accordingly, the intensity Is of the light incident from the temperature measuring optical fiber to an optical detector as modulated with an angular frequency $\omega s$ is represented as:

$$I_s = (I_{rA} + I_{sA}) \frac{1 + \cos\omega_s t}{2} \qquad (4)$$

$$= \left\{ (1 - \rho - \alpha)W + \frac{(1 - \rho - \alpha)^2 I}{2} (1 + \cos\omega_r t) \right\} \times$$

-continued $$\frac{1 + \cos\omega_s t}{2}$$

Accordingly, from each of the foregoing calculations, the outputs divided into respective frequencies issued from the respective lock-in amplifiers, that is, the output E1 due to the signal light from the target, the output E2 due to the output from the reference light transmitting through the temperature measuring optical fiber and the output E3 due to the monitored reference light are represented as:

$$E_1 = \frac{1}{\pi}\left\{(1 - \rho - \alpha)W + \frac{(1 - \rho - \alpha)^2 I}{2}\right\} \quad (5)$$

$$E_2 = \frac{1}{2\pi}(1 - \rho - \alpha)I \quad (6)$$

$$E_3 = \frac{I}{\pi} \quad (7)$$

where $\pi$ represents ratio of the circumference of a circle to its diameter.

Then, eliminating $I$ and $(1-\rho-\alpha)$ from the above equations (5), (6), (7), the following equation:

$$W = \pi(E_1 - E_2)\sqrt{\frac{E_3}{2E_2}} \quad (8)$$

can be obtained.

In this way, by performing the calculation for the equation (8) in a known operation circuit, the measuring error in the temperature due to the contaminations on the end face of the optical fiber can be compensated and displayed on a display device.

One specific embodiment of the compensating circuit according to this invention will now be described by way of FIG. 27.

FIG. 27 shows one embodiment for the system of compensating the contaminations on the incident end face of the optical fiber according to this invention, in which are shown an optical brancher 61 composed of a half mirror, optical modulators 62, 63, a reference light source 64, light detectors 65, 66, lock-in amplifiers 67–69, an arithmetic operation circuit 70, a temperature display device Dsp, a temperature measuring optical fiber F1, a reference light optical fiber F2 and a target M for which the temperature is to be measured respectively. In the drawing, the reference light from the reference light source 64 is modulated with a frequency fr in the light modulator 62 and branched into two directions by the light brancher 61, one of which is monitored by the light detector 65 and the other of which is passed through the optical fiber F2 disposed for the reference light and then irradiated from the exit end face B thereof to the incident end face A of the temperature measuring optical fiber F1.

Then, the reference light permeates the end face A of the temperature measuring optical fiber F1, modulated in the light modulator 63 below and then detected by the light detector 66.

While on the other hand, the signal light due to the radiation energy from the target M permeates the end face A of the temperature measuring optical fiber F1, modulated with the frequency fs in the light modulator 63 and then detected in the light detector 66 in the same manner as above.

While the light detected by the light detectors 65, 66 are entered into lock-in the amplifiers 67, 68, 69 respectively. Since the lock in amplifier 67 is synchronized with the light modulator 63 and the lock in amplifiers 68, 69 are synchronized with the light modulator 62 respectively, signals divided by each of the frequencies are obtained.

Among them, the lock-in amplifier 7 outputs E1, the lock-in amplifier 68 outputs E2, and the lock in amplifier 69 outptus E3 as described above.

Accordingly, the signal light intensity from the target M is process based on each of the outputs in a conventional manner in mathematical operation circuits and displayed on the display device Dsp.

As described above, since the reference light from the additional optical fiber F2 is radiated to the incident end face of the temperature measuring optical fiber F1 opposed to the target M and the transmittance is determined by the intensity of the reference light permeating through the opposed end face A, and the contaminations at the end face A are measured to compensate the optical information from the target M, wiping, purging or like other cleaning maintenance for the optical fiber is no more necessary and stable temperature measurement can be maintain for a long period of time at a high accuracy. This method is particularly advantageous for the case where it is difficult or impossible to clean the contaminated end face of the measuring optical fiber from the outside of the high temperature and high pressure furnace.

In a second embodiment for the method of compensating the contamination error, the reference light is introduced directly into the measuring optical fiber without using an exclusive optical fiber therefor as in the previous embodiment.

Referring more specifically, a reference light source is disposed separately from the target and the light therefrom is utilized to detect the contamination on the end face of the optical fiber. In view of the above, the light from the reference light source is at first modulated by a light modulator, and then branched by a optical brancher, one of which is monitored in the light detector and the other of which is entered through the incident end face of the temperature measuring optical fiber at the side opposite to the end face opposed to the target and the reflection light from the opposing surface of the target is taken out.

In this embodiment, the reflection light from the target is taken out together with the radiation energy from the target through the temperature measuring optical fiber, in which the reference light and the signal light are modulated respectively with the predetermined frequency and the intensity of the reflection light can be measured by detecting the signal corresponding to the relevant frequency, whereby the reflection factor at the end face of the temperature measuring optical fiber can be determined by the intensity of the monitored light. The reflection factor at the end face is represented as:

$$\rho = \frac{V_2}{V_3}$$

where $V_2$: intensity of the reflection light permeating through the optical fiber V3: intensity of the monitored light
Accordingly, the transmittance $$r = 1 - \rho = 1 - \frac{V_2}{V_3} \quad (1)$$

In view of the above, the radiation energy from the target for which the temperature is to be measured is calculated due to the transmittance obtained in a known temperature processing circuits obtaining required signal after the compensation is obtained and the compensated temperature can be displayed.

A preferred system for the above-described method will be described referring to FIG. 28.

FIG. 28 shows a block diagram illustrating one embodiment comprising such a compensating circuit, in which are included a temperature measuring optical fiber F and a reference light source P as a essential part of this invention disposed for detecting the contamination on the incident end face A of the optical fiber F. The light from the reference light source P is modulated with a frequency fr in an optical modualtor (chopper) 73, branched by an optical brancher 72 composed of a half mirror into two portions, one of which is monitored by an optical detector 76 and the other of which is passed through the optical brancher 71 disposed at the end face B opposite to the end face A of the optical fiber F opposed to the target M and entered through the end face B into the temperature measuring optical fiber F.

The reference light entered into the optical fiber F is reflected at the end face A of the optical fiber F opposed to the target M, passed again through the optical brancher 71, modulated with a frqeuency fs in the optical modulator 74 and then entered into the optical detector 75.

While on the other hand, the radiation energy from the target M is entered from the opposing end face A, passed through the optical fiber F and the optical brancher 71, modulated with the frequency fs and then entered into the optical detector 75 in the same manner as the modulation signal for the reference light.

In the drawing, reference numerals 77, 78, 79 represent lock-in amplifiers respectively, among which the lock-in amplifier 77 is synchronized with the optical modulator 74 and the lock-in amplifiers 78, 79 are synchronized with the optical modulator 73 respectively and they synchronously rectify the modulated signals inputted to each of them with respective frequencies.

Now considering the intensity of light entering into the optical detector 75 and the optical detector 76, the intensity of light Ir entered into the optical detector 76 is represented as:

$$I_r = \frac{I}{2}(1 + \cos \omega_r t) \quad (1)$$

where (1+Cos t) is a reflection factor at the end face A, I is an intensity of reference light and V is an intensity of radiation signal from the target M, that is, of the signal light.

While on the other hand, the intensity Is of the light entered into the optical detector 75 is represented as:

$$I_s = \left\{ (1 - \rho) W + \rho \frac{I}{2}(1 + \cos \omega_r t) \right\} \frac{1 + \cos \omega_s t}{2} \quad (2)$$

Accordingly, the output E1 from the lock-in amplifier 77 is represented as:

$$E_1 = \frac{1}{x}\left\{ (1 - \rho) W + \frac{\rho I}{2} \right\} \quad (3)$$

the output E2 from the lock in amplifier 78 is represented as:

$$E_2 = \frac{1}{2\pi} \rho I \quad (4)$$

and the output E3 from the lock in amplifier 79 is represented as:

$$E_3 = \frac{I}{\pi} \quad (5)$$

Accordingly, by eliminating I and ρ from the equations (3), (4), (5), the following equation (6) is obtained:

$$W = \frac{\pi E_3(E_1 - E_2)}{E_3 - 2E_3} \quad (6)$$

Then, the signal intensity W from the target is obtained to enable and accurate temperature measurement. In the foregoing equations, ωr represents a modulation angular frequency for the reference light, ωs is a modulation angular frequency for the signal light, ωr is 2πfr, ωs is 2πfs and π is the ratio of the circumference of a circle to the diameter.

The calculation for the equation (6) is performed in the mathematical circuit 80 shown in FIG. 28 and the results are displayed on the display device Dsp.

Further, by polarizing the reference light in the above-mentioned measurement, the spectral reflection factor ρλ at the end face A of the fiber F can be determined, which is extremely useful for the spectral measurement of the target.

FIG. 29 shows another embodiment of compensating the contamination on the end face of the optical fiber, in which the signal light from the target is detected with no modulation, whereby the structure of the detection circuit is simplified.

Specifically, in FIG. 29, while the fundamental structure of the system shown in FIG. 29 is identical with that shown in FIG. 28 excepting that the lock-in amplifiers 77, 78, 79 in FIG. 28 are replaced with synchronous rectifying circuits 85, 86 and the optical modulator below the optical fiber in FIG. 28 is replaced with an optical brancher 82 in this embodiment. Separated lights of the respective wavelength are entered into a detector 83 for the radiation energy from the target M and into a detector 84 for the reflection light at the end face. The output from the latter is introduced by way of the synchronous rectifying circuit 86 to a mathematical operation circuit 90 for the compensation of the contaminations on the end face, where it is subjected to mathematical procession together with the intensity of light derived from the reference light detector 76 through the synchronous rectifying circuit 85, and the intensity of branched light from the target and via the detector for measuring the radiation energy, and compensated with the output from the detector for the measurement of the radiation energy and then converted by way of a temperature signal conversion device Dsp into a temperature signal for display.

Since the transmittance including the decay in the optical amount at the incident end face of the optical fiber is determined by utilizing the reference light source and the optical information is compensated based thereon, the temperature within the high temperature and high pressure furnace in the hot isostatic pressing apparatus can be measured at a high accuracy with no undesired effect from the contamination on the incident end face of the measuring optical fiber without requiring troublesome and some time difficult wiping or purging maintenance for the end face of the optical fiber.

What is claimed is:

1. A method of measuring the temperature in a high pressure furnace of a hot isostatic pressing apparatus in which a heat insulating layer and a heating device are disposed inside a high pressure vessel to constitute said high pressure furnace for applying hot isostatic pressing treatment for a material to be processed contained therein, wherein a closed-end pipe having an open-end and a closed-end connected by a side wall is disposed within the furnace and has its open-end communicating with the outside of said high pressure furnace, an incident top of an optical fiber means is disposed to the open-end of said closed-end pipe so as to be capable of receiving thermally radiated light from the inside of said closed-end pipe and an exit rear end of said optical fiber means is led out through a cover and to the outside of said high pressure vessel whereby convection of the pressure medium around the incident top of said optical means is prevented, and whereby a pressure medium may pass through the open-end communicated with the outside of said closed-end pipe in the high pressure vessel and a measuring system is connected to said exit rear end to detect heat radiation power from the closed end of said closed-end pipe to thereby measure the temperature inside the furnace.

2. The method as defined in claim 1, wherein the optical fiber means is coated with metal.

3. The method as defined in claim 2, wherein the coating metal comprises metal selected from the group consisting of Fe, Ti, Cu, Zn, Pb, Sn, Al, Cr, Ni, Mo, W, Pd and Pt.

4. The method as defined in claims 1, 2, or 3, wherein the optical fiber means is led to the outside through a lower cover of the hot isostatic pressing apparatus.

5. The method as defined in claim 4, wherein the optical fiber means has a collimator at said open-end of said closed end pipe.

6. The method as defined in claim 5, wherein the optical fiber means is held at the open-end of the closed-end pipe by a holding jig.

7. The method as defined in claim 6, wherein the optical fiber means is a rod-like optical material which is made of a quartz glass rod.

8. The method as defined in claim 6, wherein the optical fiber means is a rod-like optical material which material is made of a sapphire rod.

9. The method as defined in claim 4, wherein a plurality of closed-end pipes are disposed each at a different height in the inside of the furnace.

10. The method as defined in claim 4, wherein the measuring system comprises a radiation thermometer.

11. The method as defined in claim 10, wherein the radiation thermometer detects light having a wavelength between 0.3 $\mu$m–0.6 $\mu$m.

12. A method of measuring the temperature distribution in a high pressure furnace of a hot isostatic pressing apparatus in which a heat insulating layer and a heating device are disposed inside a high pressure vessel to constitute said high pressure furnace having a plurality of heating zones for applying hot isostatic pressing treatment for a material to be processed contained therein, wherein a plurality of closed-end pipes having an open-end and a closed-end connected by a side wall each of different length are disposed within the furnace and each has its open-end communicating with the outside of said high pressure furnace and are disposed with the open end for each of said closed-end pipes being situated so as to be in equilibrium with a peripheral temperature and issue radiation heat corresponding to each of said heating zones to the inside of each of said closed-end pipes, and optical fiber means having an incident top end disposed to the open-end for each of said closed-end pipes so as to be capable of receiving thermally radiated light from the inner wall of each of said closed-end pipes and an exit rear end of said optical fiber means is led out through a cover and to the outside of said high pressure vessel whereby convection of the pressure medium around the incident top of said optical means is prevented, and whereby a pressure medium may pass through the open-end communicated with the outside of said closed-end pipe in the high pressure vessel, a measuring system is connected to each of the exit rear ends to detect heat radiation power from the inner wall of each of said closed-end pipes to produce an output, and wherein a compensating operation is performed on said output for subtracting therefrom a value indicative of heat radiation power which erroneously enters into said optical fiber means, so as to produce a temperature value due to the heat radiation power from the closed-end of the closed-end pipe in each of the heating zones in the high pressure furnace, thereby measuring the temperature distribution at the heating zone in the furnace.

13. The method as defined in claim 12, wherein the closed-end pipes are made of heat resistant material.

14. The method as defined in claim 13, wherein the closed-end pipes are disposed inside the high pressure furnace with the closed-ends of said closed-end pipes being situated to the respective heating zones corresponding to heating devices disposed in upper, middle and lower portions of said furnace.

15. The method of measuring the temperature in the high pressure furnace of a hot isostatic pressing apparatus as defined in claim 12, wherein a reference optical source produces a reference light which enters said exit rear end of the optical fiber means said reference light being reflected by the incident top end of said optical fiber means to form a reflection light of the optical fiber means said reflection light being combined with the radiation energy from the inside of the closed-end pipe, the combined energy is subsequently separated into the radiation light from the inside of the closed-end pipe and the reflected light, in order to determine an entire transmittance for the optical fiber means including the losses at the end faces thereof, said transmittance being used to amend the optical information based on the radiation energy from the inside of the closed-end pipe.

16. The method of measuring the temperature in the high pressure furnace of a hot isostatic pressing apparatus as defined in claim 15, wherein there is provided, a first optical fiber means for receiving the radiation energy in the closed-end pipe and a second optical fiber means different from said first optical fiber means, in which said reference light is irradiated through said second optical fiber means to the incident top end of said first optical fiber means, said reference light being combined with the radiation energy from the inside of the closed-end pipe and passing through said first optical fiber means, the combined energy being separated into the radiation light from the inside of the closed-end pipe and the reference light to determine the entire transmittance of said first optical fiber means including any optical loss at the end faces of said optical fiber means, said transmittance being used to compensate the optical information based on the radiation energy from the inside of the closed end-pipe.

17. An apparatus of measuring the temperature in a high pressure furnace of a hot isostatic pressing apparatus which has a heat insulation layer and a heating device disposed with a high pressure vessel comprising:
 a pipe having an open-end and a closed-end connected by a side wall which is disposed in said furnace;
 means for enabling a pressure medium to pass through said pipe;
 an optical fiber means having an incident top end disposed in said pipe, wherein the incident top end of said optical fiber means is disposed at the open end of said pipe such that the top of said optical fiber means receives thermally radiated light from the inside of said pipe whereby convection of the pressure medium around the incident top of said optical means is prevented, and whereby a pressure medium may pass through the open-end communicated with the outside of said closed-end pipe in the high pressure vessel;
 cover means for said high pressure vessel;
 means for passing an end of said optical fiber means, that is opposite from said incident top end, for coupling said optical fiber means, to the outside of said pressure vessel;
 means for measuring connected to said optical fiber means, outside of said high pressure vessel, for detecting heat radiation power from the closed end of said pipe transmitted through said optical fiber means.

18. An apparatus as in claim 17 wherein said optical fiber means is comprised of a single optical fiber.

19. An apparatus as in claim 17 wherein said optical fiber means is comprised of a bundle of optical fibers.

20. An apparatus as in claim 17 wherein said optical fiber means is comprised of an optical rod-like member.

21. An apparatus as in claims 17, 18, 19 or 20 wherein said optical fiber means is coated with a metal.

22. An apparatus as in claim 21 wherein said coating metal comprises a metal selected from the group of Fe, Ti, Cu, Zn, Pb, Sn, Al, Cr, Co, Ni, Mo, W, Pd, or Pt.

23. An apparatus as in claim 22 wherein said optical fiber means has a collimator disposed at the open end of the closed-end pipe.

24. An apparatus as in claim 22 further comprising:
 a holding jig for holding the optical fiber means at the open end of said pipe.

25. An apparatus as in claim 20 wherein said rod-like member is made of a quartz glass rod.

26. An apparatus as in claim 20 wherein said rod-like member is made of a sapphire rod.

27. An apparatus as in claim 17 further comprising:
 a plurality of closed-end pipes each disposed at different heights in the inside of said furnace.

28. An apparatus as in claims 17 or 27 wherein said means for measuring comprises a radiation thermometer.

29. An apparatus as in claim 28, wherein said radiation thermometer detects light wavelengths between 0.3 $\mu$m–0.6 $\mu$m.

30. An apparatus as in claim 17 further comprising a closure at the open-end of said pipe;
 a means for fixing said optical fiber means into said closure; and photo-electric conversion means for conversion of the energy transmitted by said optical fiber.

31. An apparatus as in claim 17, wherein said measuring means is fixed to said cover means and wherein a photoelectric conversion is carried out in said measuring means which converges the radiation transmitted through said optical fiber means to create an electrical signal.

32. An apparatus of measuring the temperature in a high pressure furnace of a hot isostatic pressing apparatus which has a heat insulating layer and a heating device creating heating zones disposed with a high pressure vessel comprising:
 a plurality of closed-end pipes each of different lengths having an open-end and a closed-end connected by a side wall each having its open-end communicated with the outside of said high pressure furnace with each of said pipes being disposed within said furnace; and
 wherein the closed ends are situated such that the closed-end of each of said pipes is in equilibrium with the peripheral temperature of said furnace and may issue radiation heat corresponding to each of the heating zones of said furnace to the inside of each of the closed-end of said pipes;
 means for enabling a pressure medium to pass through said pipes;
 optical fiber means having an incident top end disposed in each of said pipes, wherein the incident top end of said optical fiber means is disposed at the open-end of each of said pipes such that the incident end face of said optical fiber means receives thermally radiated light from the insides of said pipes; whereby convection of the pressure medium around the incident top of said optical means is prevented, and whereby a pressure medium may pass through the open-end communicated with the outside of said closed-end pipe in the high pressure vessel
 cover means for said high pressure vessel;
 means for passing the ends of said optical fiber means, that is opposite from said incident top end, for coupling said optical fiber means, to the outside of said pressure vessel;
 means for measuring coupled to each of said optical fiber means for detecting the heat radiation transmitted through said optical fiber means;
 compensating means coupled to said measuring means for compensating for the temperature due to heat radiation power entering from the side wall of said closed end pipe in each of the heating zones in said high pressure furnace, thereby measuring the temperature distribution in each of the heating zones of said furnace.

33. An apparatus as in claims 17 or 32 wherein said pipes are made of heat resistant material.

34. An apparatus as in claims 17 or 32 further comprising:

reference light sources corresponding in number to the number of optical fiber means for providing reference light which enters the exiting end of said optical fiber means such that the transmitted reference light is reflected on the incident end face of said optical fiber means that receives the radiation energy of said closed end of the pipes;

reference compensation means for compensating said measurement obtained by said measurement means based on said reflected reference light.

35. An apparatus as in claims 17 or 32 wherein said optical fiber means comprises: a bundle of optical fibers.

* * * * *

UNITED STATES PATENT AND TRADEMARK OFFICE
CERTIFICATE OF CORRECTION

PATENT NO. : 4,666,314
DATED : May 19, 1987
INVENTOR(S) : Tojyo, et al.

It is certified that error appears in the above-identified patent and that said Letters Patent is hereby corrected as shown below:

--Priority information is incorrectly recorded.
   The third line should read:

Dec. 29, 1983 [JP] Japan.........58-245746

Signed and Sealed this

Fifteenth Day of September, 1987

Attest:

DONALD J. QUIGG

Attesting Officer     Commissioner of Patents and Trademarks